US012518732B2

(12) United States Patent
Vasilyev et al.

(10) Patent No.: US 12,518,732 B2
(45) Date of Patent: Jan. 6, 2026

(54) ACTIVE NOISE CANCELLATION DEVICE AND METHOD

(71) Applicant: HUAWEI TECHNOLOGIES CO., LTD., Shenzhen (CN)

(72) Inventors: Vladislav Igorevich Vasilyev, Moscow (RU); Alexey Alexandrovich Petrovsky, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 18/296,760

(22) Filed: Apr. 6, 2023

(65) Prior Publication Data

US 2023/0282196 A1 Sep. 7, 2023

Related U.S. Application Data

(63) Continuation of application No. PCT/RU2020/000527, filed on Oct. 8, 2020.

(51) Int. Cl.
*G10K 11/178* (2006.01)

(52) U.S. Cl.
CPC .................. *G10K 11/17853* (2018.01); *G10K 11/17827* (2018.01); *G10K 11/17879* (2018.01); *G10K 11/17881* (2018.01); *G10K 2210/509* (2013.01)

(58) Field of Classification Search
CPC ........ G10K 11/17853; G10K 11/17827; G10K 11/17879; G10K 11/17881; G10K 2210/509
See application file for complete search history.

(56) References Cited

U.S. PATENT DOCUMENTS 5,425,105 A * 6/1995 Lo .................... G10K 11/17885 381/71.8
2008/0112570 A1 5/2008 Asada et al.
(Continued)

FOREIGN PATENT DOCUMENTS

EP 2577651 B1 4/2014
EP 2953379 A1 12/2015
EP 3382692 A1 10/2018
EP 3407347 A1 11/2018

OTHER PUBLICATIONS

Kuo et al., "Active Noise Control: A Tutorial Review," Proceedings of the IEEE, vol. 87, No. 6, Total 31 pages (Jun. 1999).
(Continued)

*Primary Examiner* — Ping Lee
(74) *Attorney, Agent, or Firm* — Leydig, Voit & Mayer, Ltd.

(57) ABSTRACT

An active noise cancellation (ANC) device is provided. The ANC device comprises a first microphone configured to generate a first microphone signal in response to a first acoustic noise in a first zone of the ANC device, a loudspeaker configured to be driven with a loudspeaker signal, and a second microphone configured to generate a second microphone signal, wherein the second microphone signal comprises a residual noise component based on a second acoustic noise in a second zone of the ANC device. Moreover, the ANC device comprises processing circuitry configured to generate, using a first filter, a compensation signal based on the first microphone signal and further configured to generate, using a second filter, the loudspeaker signal based on the compensation signal and the second microphone signal.

16 Claims, 33 Drawing Sheets

(56) References Cited

U.S. PATENT DOCUMENTS

| | | | | |
|---|---|---|---|---|
| 2009/0279709 | A1* | 11/2009 | Asada | G10K 11/17833 381/71.1 |
| 2010/0131269 | A1* | 5/2010 | Park | G10K 11/17857 381/71.1 |
| 2010/0272283 | A1 | 10/2010 | Carreras et al. | |
| 2013/0259250 | A1* | 10/2013 | Nicholson | G10K 11/17881 381/71.6 |
| 2014/0126734 | A1 | 5/2014 | Gauger, Jr. et al. | |
| 2014/0307887 | A1 | 10/2014 | Alderson | |
| 2015/0154950 | A1 | 6/2015 | Ring | |
| 2015/0195646 | A1 | 7/2015 | Kumar et al. | |
| 2017/0148428 | A1* | 5/2017 | Thuy | H04R 1/1083 |
| 2018/0122400 | A1 | 5/2018 | Rasmussen | |
| 2020/0313655 | A1* | 10/2020 | Bernstein | G10K 11/17817 |

OTHER PUBLICATIONS

Hansen, "Understanding Active Noise Cancellation," Taylor and Francis, total 174 pages (2001).

Landau et al., "Adaptive and Robust Active Vibration Control," Methodology and Tests, Springer, Jul. 2017, ISBN 978-3-319-41450-8, Total 405 pages (May 24, 2016).

Benois et al., "Evaluation of a Decoupled Feedforward-Feedback Hybrid Structure for Active Noise Control in a Multi- Source Environment," International Congress and Exposition on Noise Control Engineering, INTER-NOISEA, Hong Kong, total 6 pages (Aug. 2017).

* cited by examiner

ACTIVE NOISE CANCELLATION DEVICE AND METHOD

CROSS-REFERENCE TO RELATED APPLICATIONS

This application is a continuation of International Application No. PCT/RU2020/000527, filed on Oct. 8, 2020, the disclosure of which is hereby incorporated by reference in its entirety.

TECHNICAL FIELD

The present disclosure relates to sound processing in general. More specifically, the disclosure relates to an active noise cancellation (ANC) device and method.

BACKGROUND

Noise cancellation is a common task in a wide variety of applications. Active noise cancellation (ANC) is a noise reduction technology applied to sound waves and exploiting destructive interference of sound waves. In an ANC device, such as an ANC headset, the noise or disturbance is an external sound wave to be cancelled or at least reduced. The goal of an ANC device is to generate a compensating sound wave leading to destructive interference with the noise at the desired attenuation area (usually referred to as silent zone). The compensating sound wave is also referred to as anti-noise. The performance of an ANC device is generally characterized by the relative noise reduction level (also referred to as attenuation) and the size of the frequency range, i.e. the bandwidth, wherein the reduction is stable. Considering noise cancellation as the primary goal, higher attenuation and wider attenuation bandwidth means better performance of the ANC device.

SUMMARY

The present disclosure provides an improved active noise cancellation device and method.

According to a first aspect, an active noise cancellation (ANC) device is provided. The ANC device comprises a first microphone configured to generate a first microphone signal in response to a first external acoustic noise in a first zone of the ANC device, e.g. a zone of the ANC device exposed to environmental noise. Moreover, the ANC device comprises a cancelling loudspeaker configured to be driven with a loudspeaker signal and a second silent zone microphone configured to generate a second microphone signal, wherein the second microphone signal comprises a residual noise component based on a residual second acoustic noise in a second zone of the ANC device, e.g. silent zone of the ANC device. The ANC device further comprises a processing circuitry configured to generate using a first filter (herein also referred to as feedforward ANC filter, i.e. an FF ANC filter) a compensation, i.e. noise reduction or cancellation signal based on the first microphone signal. Moreover, the processing circuitry is further configured to generate using a second filter (herein also referred to as feedback ANC filter, i.e. an FB ANC filter) the loudspeaker signal, i.e. the anti-noise signal based on the compensation signal and the second microphone signal.

Advantageously, the ANC device provides improved active noise cancellation by combining the FF ANC filter and the FB ANC filter in a queue. Advantageously, this leads to an improved FF ANC filter anti-noise stability supported by the FB ANC filter without any unexpected attenuation. The FF ANC filter processes the observed environmental noise and sends it to the silent zone and is configured to predict the noise transfer. The FB ANC filter provides a stable transfer path for the FF ANC filter and reduces residual noise, which is acquired as the difference between the predicted FF ANC anti-noise and the actually observed noise in the silent zone.

The ANC device may be a headphone, e.g. an over-ear, on-ear or in-ear headphone. The first zone may be an outer zone of the headphone, which may also be referred to as external or environmental zone of the headphone. The second zone may be an inner zone of the headphone, which may also be referred to as internal zone, or as silent zone (e.g. in mute mode) or playback or listening zone (e.g. in playback mode) of the headphone.

In a further possible implementation form of the first aspect, the processing circuitry is configured to generate using the second filter, i.e. the FB ANC filter the loudspeaker signal based on a difference between the compensation signal and the second microphone signal.

In a further possible implementation form of the first aspect, the second microphone signal comprises the residual noise component based on the residual second acoustic noise in the second zone of the ANC device and a playback signal component. The processing circuitry is configured to generate using the second filter, i.e. the FB ANC filter the loudspeaker signal based on the compensation signal, the second microphone signal and a playback signal. Thus, advantageously, the ANC device provides improved active noise cancellation in a playback mode as well.

In a further possible implementation form of the first aspect, the processing circuitry is configured to generate using the second filter, i.e. the FB ANC filter the loudspeaker signal based on a difference between a sum of the compensation signal and the playback signal and the second microphone signal.

In a further possible implementation form of the first aspect, the processing circuitry is further configured to generate using an equalization filter (herein also referred to as EQ ANC filter) an equalized playback signal based on the playback signal, wherein the processing circuitry is configured to generate using the second filter, i.e. the FB ANC filter the loudspeaker signal based on a difference between a sum of the compensation signal and the equalized playback signal and the second microphone signal.

In a further possible implementation form of the first aspect, the equalization filter, i.e. the EQ ANC filter comprises at least one of an infinite impulse response (IIR) filter, a finite impulse response (FIR) filter, and a warped FIR filter.

In a further possible implementation form of the first aspect, the second filter, i.e. the FB ANC filter comprises a plurality of second filter parameters, wherein the processing circuitry is configured to adjust, in particular optimize the plurality of second filter parameters for extending a frequency range of the second filter, i.e. the FB ANC filter.

In a further possible implementation form of the first aspect, the second filter, i.e. the FB ANC filter comprises at least one of a IIR filter, a FIR filter, and a warped FIR filter.

In a further possible implementation form of the first aspect, the first filter, i.e. the FF ANC filter comprises a plurality of first filter parameters, wherein the processing circuitry is configured to adjust, in particular optimize the plurality of first filter parameters together with the plurality of second filter parameters of the second filter, i.e. the FB ANC filter for extending the frequency range of the second filter and improving the noise cancellation performance of the first filter and the second filter.

In a further possible implementation form of the first aspect, the first filter, i.e. the FF ANC filter comprises at least one of a IIR filter, a FIR filter, and a warped FIR filter.

In a further possible implementation form of the first aspect, the equalization filter comprises a plurality of equalization filter parameters, wherein the processing circuitry is configured to adjust, in particular optimize the plurality of equalization filter parameters together with the plurality of first filter parameters of the FF ANC filter and the plurality of second filter parameters of the FB ANC filter for extending the frequency range of the second filter, i.e. the FB ANC filter, for improving the noise cancellation performance of the first filter and the second filter and for compensating high-frequency attenuation of the second filter with the equalization filter, i.e. the EQ ANC filter.

According to a second aspect an active noise cancellation, ANC, method is provided. The ANC method comprises the steps of:

- generating a first microphone signal in response to an external first acoustic noise in a first zone;
- generating a second microphone signal, wherein the second microphone signal comprises a residual noise component based on a residual second acoustic noise in a second zone;
- generating using a first filter, i.e. the FF ANC filter a compensation, i.e. noise reduction or cancellation signal based on the first microphone signal;
- generating using a second filter, i.e. the FB ANC filter a loudspeaker signal based on the compensation signal and the second microphone signal; and driving a cancelling loudspeaker with a loudspeaker signal.

In a further possible implementation form of the second aspect, the second microphone signal comprises the residual noise component based on the second acoustic noise in the second zone and a playback signal component, wherein the step of generating the loudspeaker signal comprises generating using the second filter, i.e. the FB ANC filter the loudspeaker signal based on the compensation signal, the second microphone signal and a playback signal.

In a further possible implementation form of the second aspect, the step of generating the loudspeaker signal comprises generating using the second filter, i.e. the FB ANC filter the loudspeaker signal based on a difference between a sum of the compensation signal and the playback signal and the second microphone signal.

In a further possible implementation form of the second aspect, the ANC method according to the second aspect further comprises the step of generating using an equalization filter an equalized playback signal based on the playback signal, wherein the step of generating the loudspeaker signal comprises generating using the second filter, i.e. the FB ANC filter the loudspeaker signal based on a difference between a sum of the compensation signal and the equalized playback signal and the second microphone signal.

The ANC method according to the second aspect of the present disclosure can be performed by the ANC device according to the first aspect of the present disclosure. Thus, further features of the ANC method according to the second aspect of the present disclosure result directly from the functionality of the ANC device according to the first aspect of the present disclosure as well as its different implementation forms described above and below.

According to a third aspect, a computer program product comprising a non-transitory computer-readable storage medium for storing program code which causes a computer or a processor to perform the ANC method according to the second aspect, when the program code is executed by the computer or the processor, is provided.

According to a fourth aspect, a computer program comprising program code which causes a computer or a processor to perform the ANC method according to the second aspect, when the program code is executed by the computer or the processor, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

Figure 1:
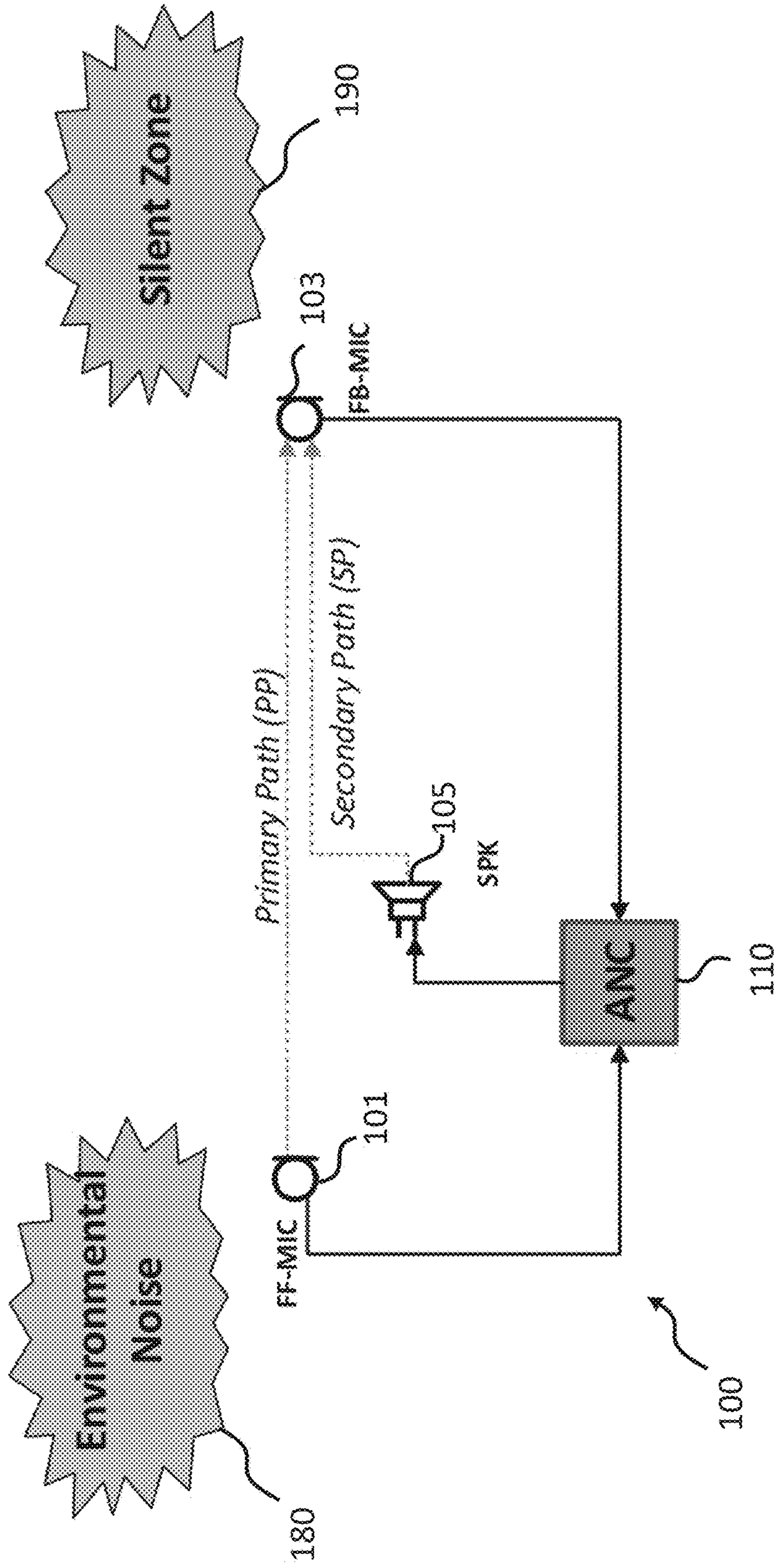
FIG. 1 is a schematic diagram illustrating the general architecture of an ANC device.

Before describing different embodiments, in the following some terminology as well as technical background concerning active noise cancellation (ANC) will be introduced. FIG. 1 is a schematic diagram illustrating the general architecture of an ANC device 100, such as headphones 100, e.g. over-ear, on-ear or in-ear (the latter being also referred to as earbuds, see description of FIG. 2) headphones. Usually, a ANC processing circuitry 110 of the ANC device 100 takes into account one or more of the sound transfer paths illustrated in FIG. 1, namely a primary path (PP) and a secondary path (SP) for performing ANC. The PP results in changes in magnitude and phase of disturbances due to the headphones materials and position, and angle of incidence. The PP affects the noise difference between the environmental noise 180 detected by a FF microphone (FF-MIC) 101 and a silent zone 190 microphone or feedback microphone (FB-MIC) 103. The (SP) depends on the characteristics of a speaker (SPK) 105, the FB-MIC 103 and the acoustic path between these components. The SP can be modeled by a transfer function for sound wave propagation from the SPK 105 to the FB-MIC 103.

As will be appreciated, the PP illustrated in FIG. 1 is a virtual transfer path, i.e. not characterizing the actual sound wave propagation. In fact, the noise sound wave is radiated by a distant source and reaches the FF-MIC 101 and FB-MIC 103 along separate paths. Thus, the PP characterizes the difference of its arrival at the position of the FF-MIC 101 and the FB-MIC 103.

Figure 2:
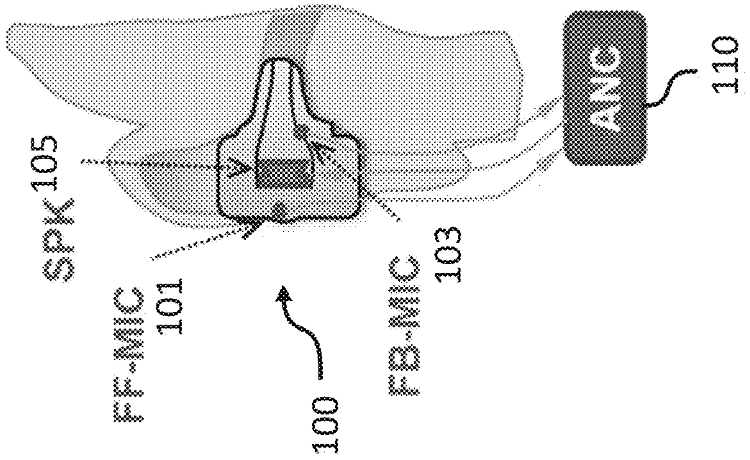
FIG. 2 is a diagram illustrating an ANC device in the form of an earbud.

FIG. 2 is a diagram illustrating an ANC device 100 in the form of an earbud inserted into the ear of a listener. As illustrated in FIG. 2, the FF-MIC 101 is mounted on an outer surface of a housing of the earbud to capture external noise (outer zone of the ANC device). The FB-MIC 103 is placed to record the sound pressure in the inner cavity defined by the housing of the earbud and the ear-canal (inner zone of the ANC device). The SPK 105 is placed in the inner cavity for emitting sound waves based on a loudspeaker signal provided by the ANC processing circuitry 110 into the ear-canal. Usually, the FF-MIC 101 is mounted to provide a stable PP with minimum dependency from direction of incidence of the external noise. The FB-MIC 103 is generally arranged close to the silent zone with a small sound wave propagation time from the SPK 105. The placement and the acoustic characteristics of the SPK 105 are usually optimized regarding a stable SP with minimum dependency from the specific use-case (for instance, headphones wearing style, earbuds leakage, and the like).

Embodiments provide audio processing devices for ANC that may be operated in one or two different modes, namely in a muted mode and/or a playback mode. In the muted mode, the main goal of an ANC device is to reduce any environmental noise to a comfortable level for a listener. In the playback mode, the main goal of an ANC device is to improve the subjective sound perception of the listener during music playback, conversation, and the like.

Figure 3A:
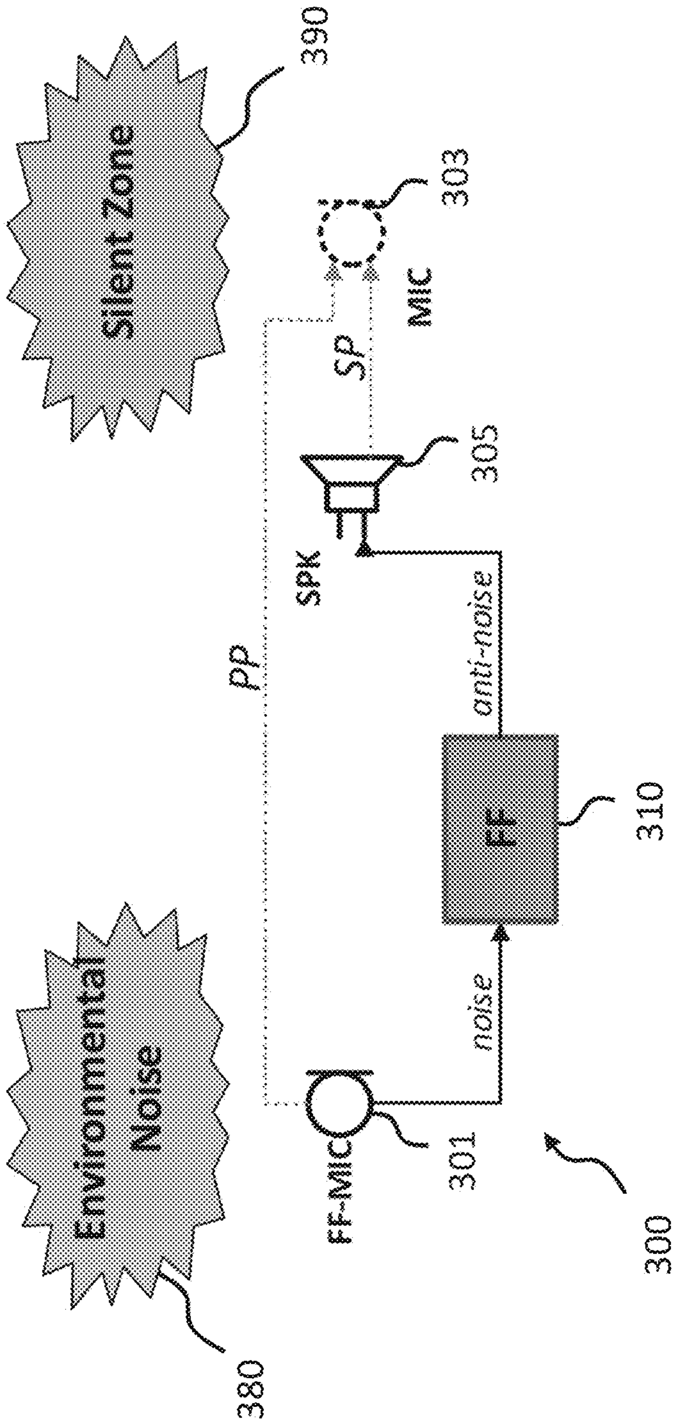
FIG. 3*a* is a schematic diagram illustrating the architecture of a FF ANC device in the muted mode.

FIG. 3*a* shows a schematic diagram illustrating an ANC device 300 implementing a FF ANC (FF ANC) scheme in the muted mode. The FF ANC device 300 captures environmental noise 380 with a FF microphone (FF-MIC) 301 and is configured to generate anti-noise in the silent zone 390 based on the preliminary knowledge of noise propagation via the PP and anti-noise propagation via the SP. The FF ANC device 300 has a relatively simple design based on minimizing the difference between PP and SP with a FF ANC filter 310 provided by a processing circuitry of the FF ANC device 300.

Figure 3B:
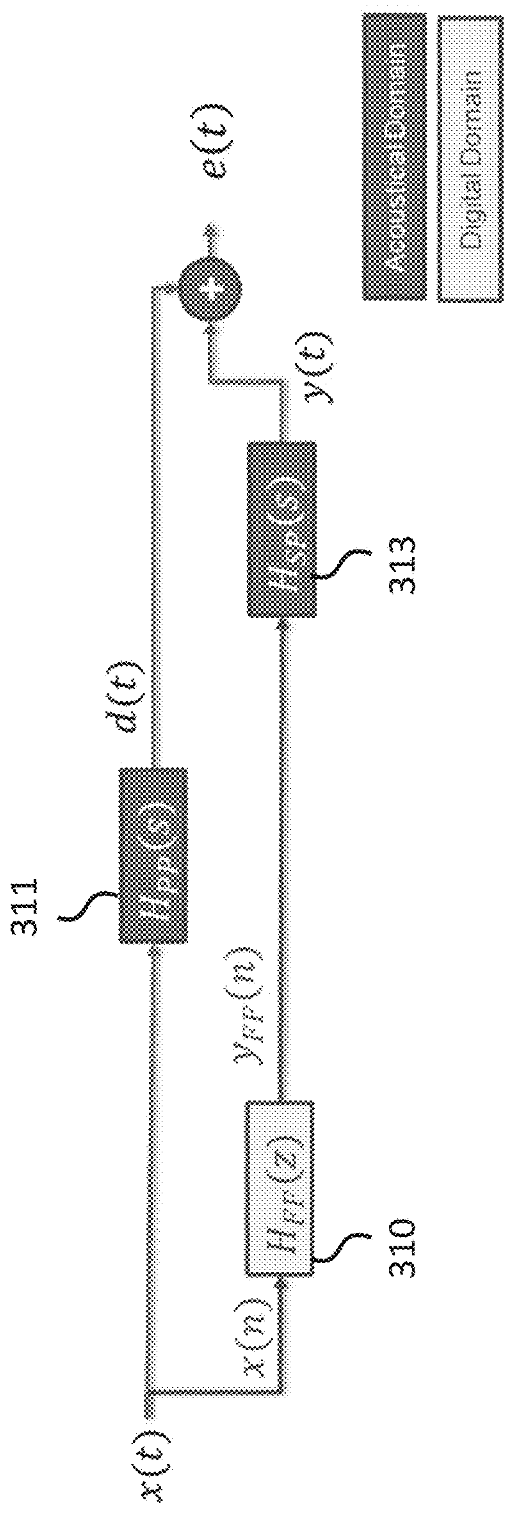
FIG. 3*b* is a schematic diagram illustrating aspects of the signal processing implemented by the FF ANC device of FIG. 3*a;*

A signal processing scheme implemented by the FF ANC device 300 of FIG. 3*a* is shown in FIG. 3*b*. The noise x(t) passes along the primary path described by the transfer function $H_{PP}(s)$ 311 leading to an observed disturbance d(t). The noise x(t) is converted to a digital signal x(n), which is processed with the FF ANC digital filter 310 (such as an IIR, FIR, Warped FIR filter or the like). The transfer function $H_{FF}(z)$ of the FF ANC digital filter 310 results in an FF anti-noise digital signal $y_{FF}(n)$. The signal $y_{FF}(n)$ passes along the secondary path SP described by the transfer function $H_{SP}(s)$ 313 leading to the analog anti-noise y(t), i.e. the noise-compensation signal. The destructive interference of d(t) and y(t) in the silent zone results in the residual noise e(t).

Figure 4A:
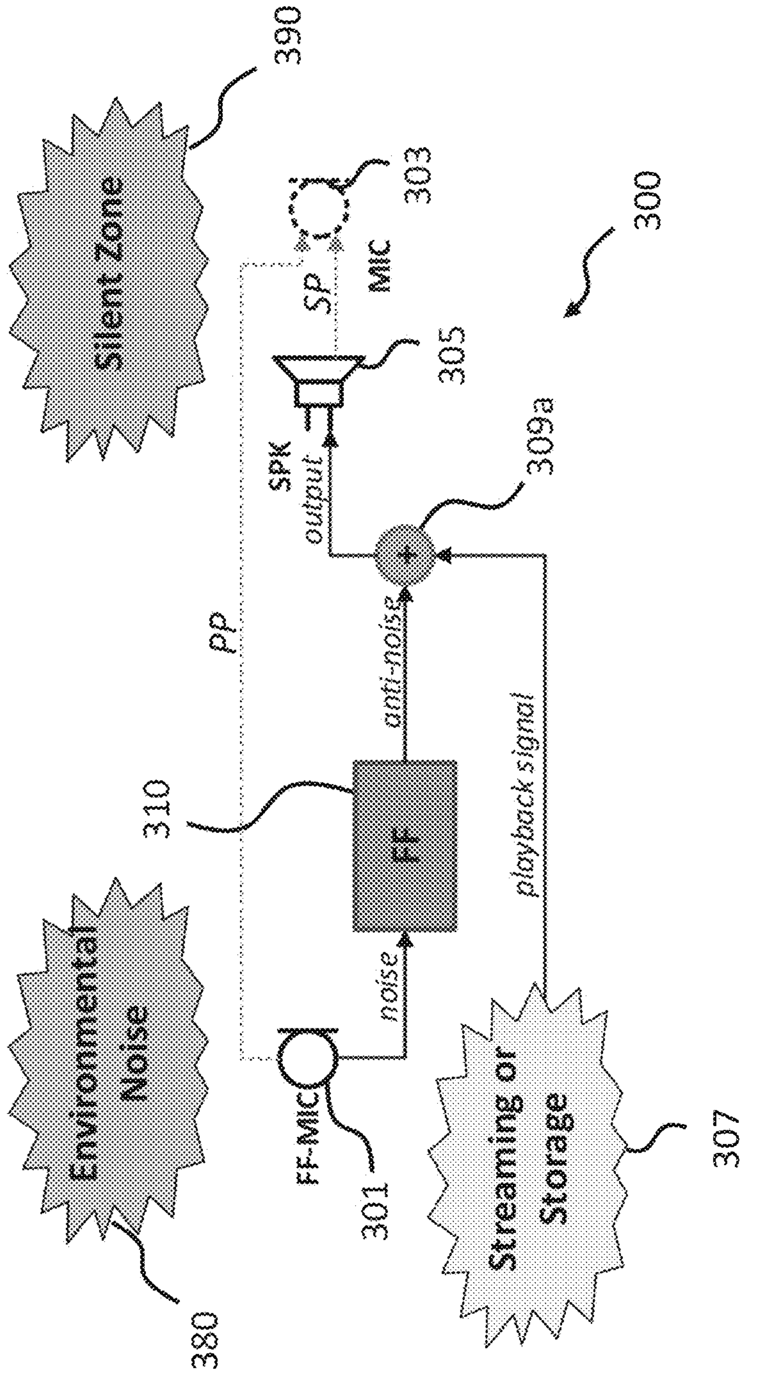
FIG. 4*a* is a schematic diagram illustrating the architecture of a FF ANC device in the playback mode.

FIG. 4*a* shows a schematic diagram illustrating the ANC device 300 implementing a FF ANC scheme in the playback mode. As already described above, the main goal of the playback mode is the non-destructive noise cancellation during the playback of a useful signal, which can be either streamed in any manner from a network or sent to the speaker from an internal storage, as illustrated by the reference sign 307 in FIG. 4*a*. As will be appreciated, FF ANC does not generally require any special measures for playback signal compensation or considering anti-noise generation in the playback signal. FF ANC mixes the anti-noise and the playback signal with no specific processing and sends the resulting signal to the speaker 305.

Figure 4B:
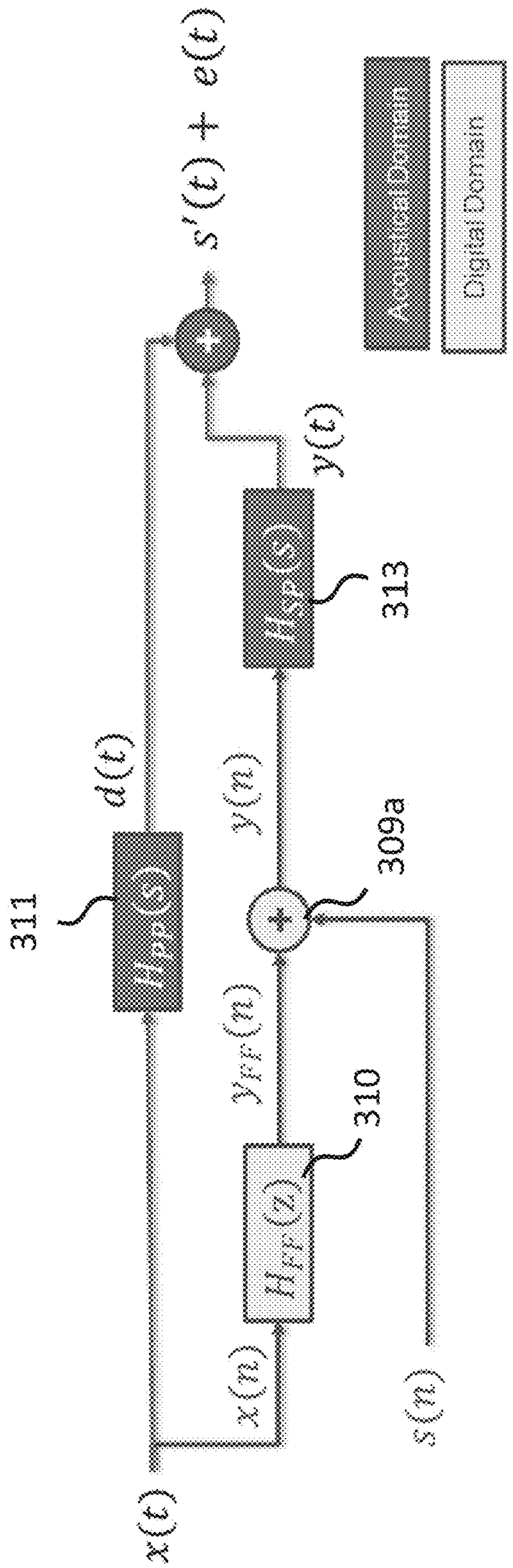
FIG. 4*b* is a schematic diagram illustrating aspects of the signal processing implemented by the FF ANC device of FIG. 4*a;*

More specifically, a signal processing scheme implemented by the FF ANC device 300 of FIG. 4*a* is shown in FIG. 4*b*. The noise x(t) passes along the primary path described by the transfer function $H_{PP}(s)$ 311 leading to the observed disturbance d(t). The noise x(t) is converted to a digital signal x(n), which is processed with the FF ANC digital filter 310 (such as an IIR, FIR, Warped FIR filter or the like) having the transfer function $H_{FF}(z)$ resulting in the FF anti-noise digital signal $y_{FF}(n)$ . The anti-noise signal, i.e. the compensation signal $y_{FF}(n)$ is mixed by a mixer 309*a* with a digital playback signal s(n) resulting in an digital output signal y(n). The digital output signal y(n) passes along the secondary path described by the transfer function $H_{SP}(s)$ 313 resulting in the analog anti-noise signal y(t). The destructive interference of d(t) and y(t) in the silent zone results in an analog playback signal s'(t) mixed with the residual noise e(t).

For the FF ANC device 300 illustrated in FIGS. 3*a*, 3*b* and 4*a*, 4*b* the goal of selecting, i.e. designing the filters of the FF ANC is the approximation of the primary path (PP) by the FF filter output passed through the secondary path (SP), which can be represented using digital models of PP $H_{PP}(z)$ and SP $H_{SP}(z)$ as:

$$H_{PP}(z)=-H_{SP}(z)*H_{FF}(z) \quad [1]$$

Once the FF filter is designed, the FF ANC noise attenuation can be estimated as:

$$H_{FF}^{at}(z)=H_{PP}(z)-H_{SP}(z)*H_{FF}(z) \quad [2]$$

Figure 5:
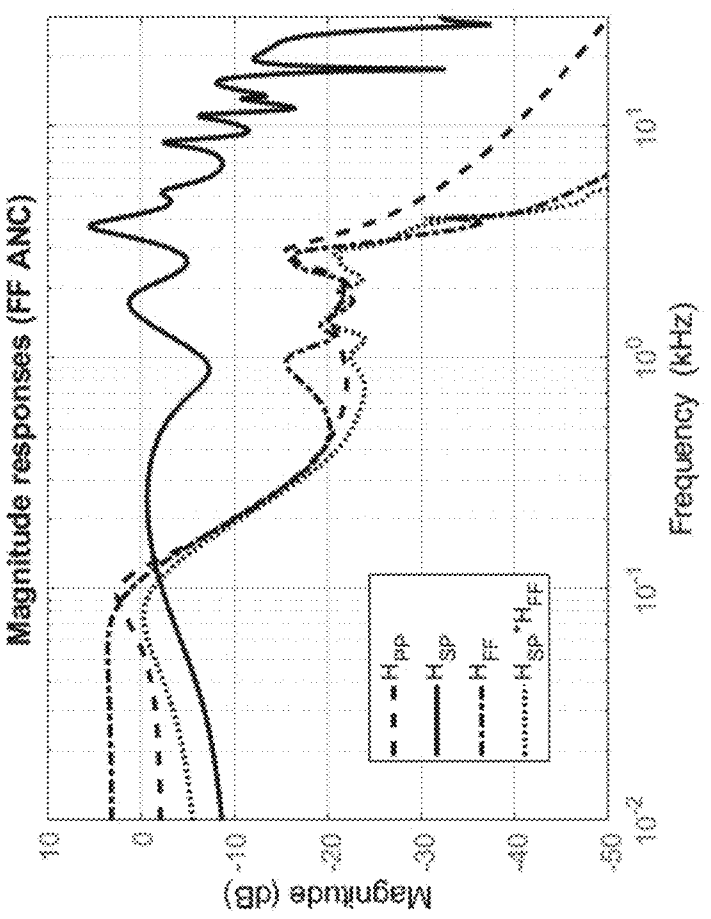
FIG. 5 shows as a function of frequency the magnitude responses of different transfer functions of a FF ANC filter of a HYBRID ANC device.

For modeling the PP a low-pass filter may be used with a cut-off frequency determined by the geometric shape of the FF ANC device 300 as well as the environment, while the SP is a low-pass filter with a much higher cut-off frequency than for the PP, which is defined by the acoustical design and the placement of the silent zone MIC 303. Thus, the FF ANC filter 310 generally matches a low-pass filter with a cut-off frequency and a roll-off rate depending on the PP shape. An FF ANC filter design (i.e. the magnitude responses of the related transfer functions) for overhead headphones implementing a FF ANC scheme is shown in FIG. 5.

Figure 6A:
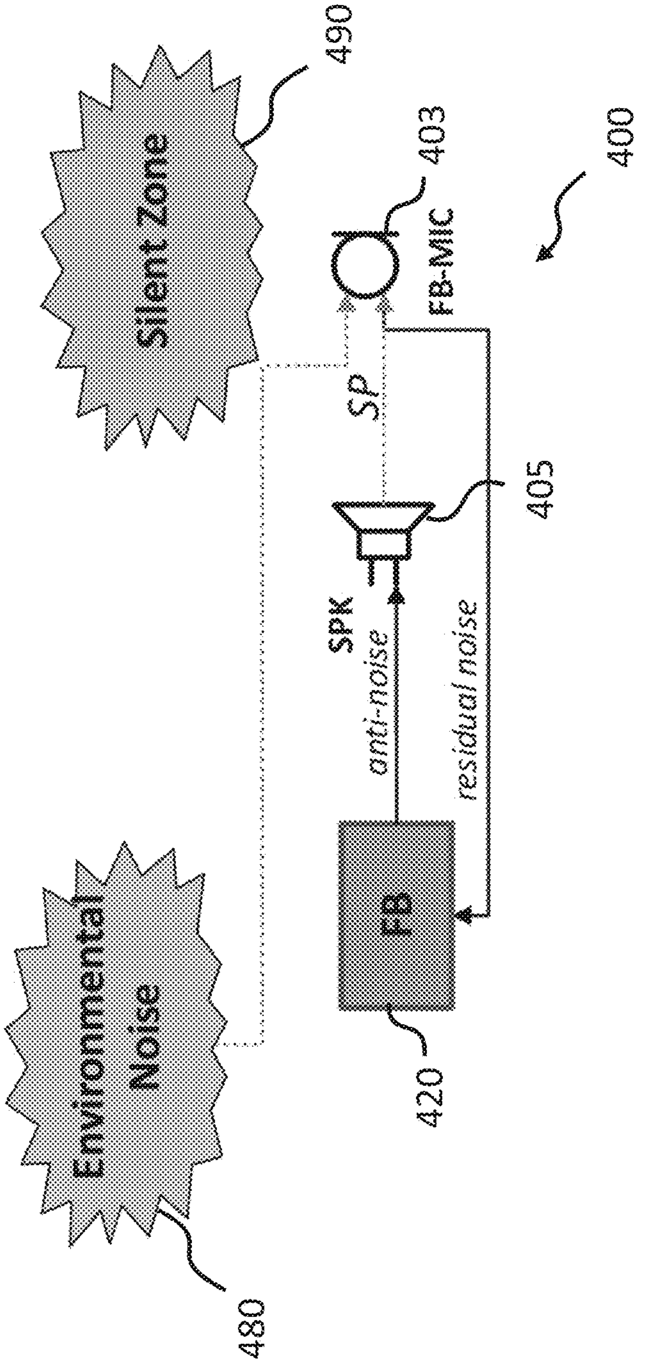
FIG. 6*a* is a schematic diagram illustrating the architecture of a FB ANC device in the muted mode.
Figure 6B:
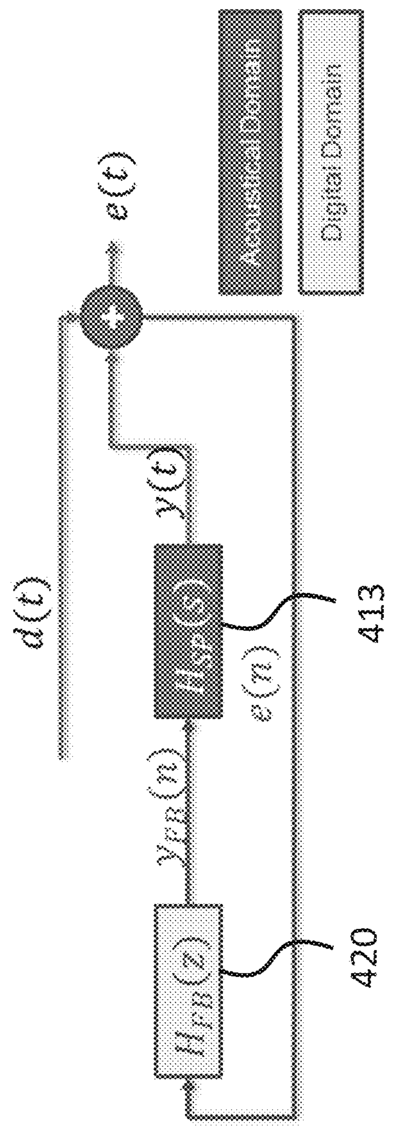
FIG. 6*b* is a schematic diagram illustrating aspects of the signal processing implemented by the FB ANC device of FIG. 6*a;*

FIG. 6*a* shows a schematic diagram illustrating an ANC device 400 implementing FB ANC scheme in the muted mode. The FB ANC device 400 captures environmental noise 480 observed in the silent zone 490 with a feedback microphone (FB-MIC) 403 and is configured to generate anti-noise by means of the anti-noise (from a speaker 405) propagating along the SP. A signal processing scheme implemented by the FB ANC device 400 of FIG. 6*a* is shown in FIG. 6*b*. The disturbance d(t) is an environmental noise passing to the silent zone 490. The analog anti-noise signal y(t) interferes with the observed disturbance d(t) resulting in a residual noise e(t). The residual noise is converted to the digital signal e(n). The digital residual noise e(n) is processed with an FB ANC digital filter 420 having the transfer function $H_{FB}(z)$ (such as an IIR, FIR, Warped FIR filter or the like) resulting in the digital anti-noise signal $y_{FB}(n)$. The digital anti-noise signal $y_{FB}(n)$ passes along the secondary path described by the transfer function $H_{SP}(s)$ 413 resulting in the analog anti-noise signal, i.e. the compensation signal y(t).

For a FB ANC scheme in the playback mode the goal of non-destructive noise cancellation in the sense of obtaining the playback signal is especially challenging because it is difficult to distinguish the noise from the useful signal. According to one approach SP replica may be acquired and the modeled playback signal propagation may be subtracted from the actual FB-MIC signal. Such an approach is implemented in the FB ANC device 400 illustrated in FIG. 7*a*, which in comparison with the FB ANC device 400 illustrated in FIGS. 6*a* and 6*b* further includes a SP replica filter 430 (as well as a further mixer 409*b*).

Figure 7A:
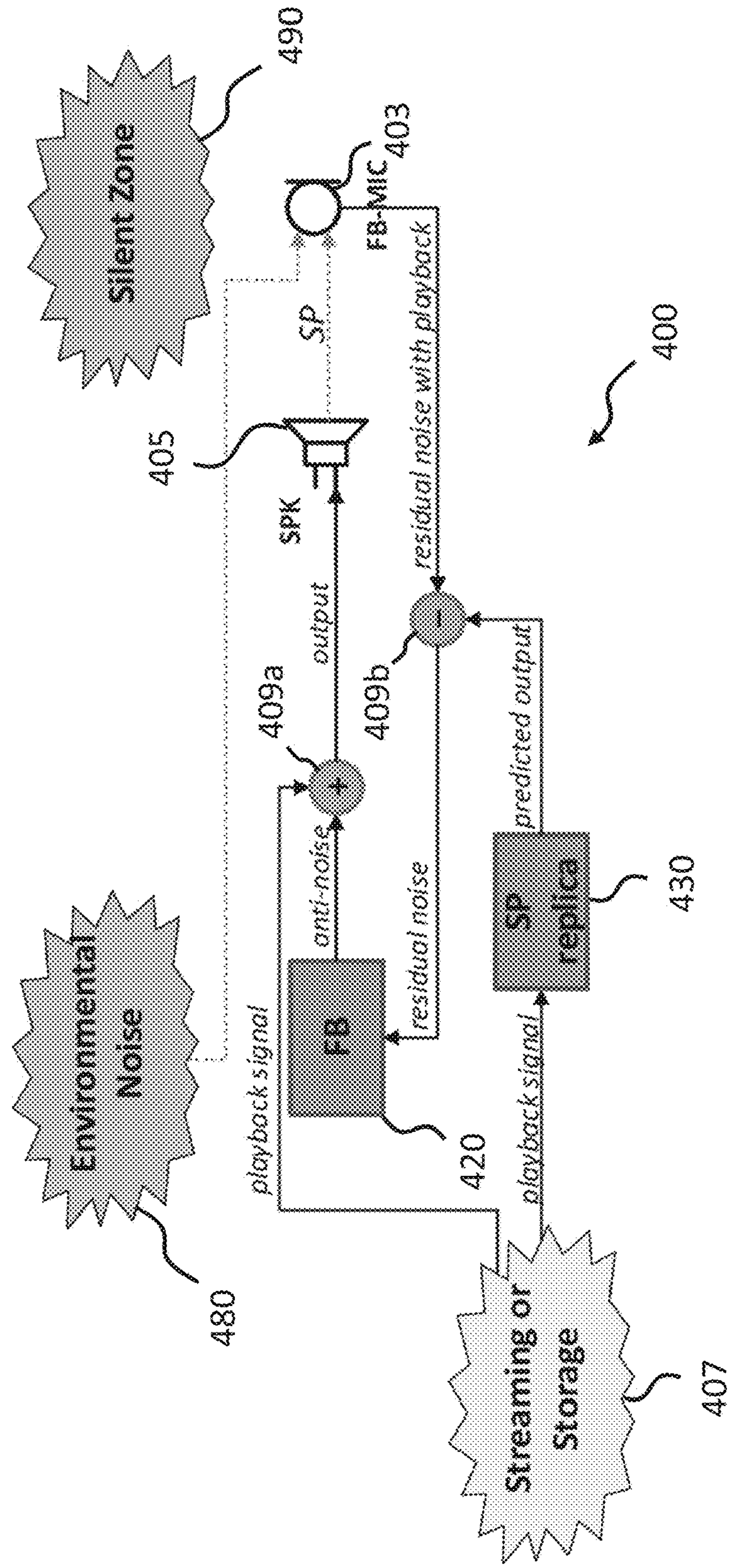
FIG. 7*a* is a schematic diagram illustrating the architecture of a FB ANC device in the playback mode.
Figure 7B:
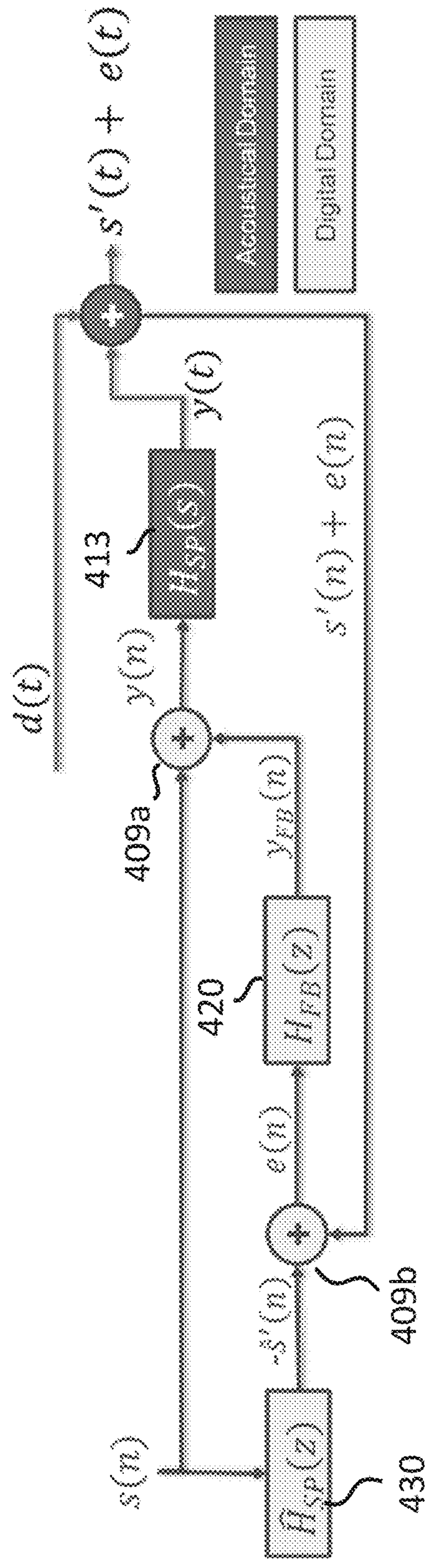
FIG. 7*b* is a schematic diagram illustrating aspects of the signal processing implemented by the FB ANC device of FIG. 7*a;*

A signal processing scheme implemented by the FB ANC device 400 of FIG. 7*a* is shown in FIG. 7*b*. The noise x(t) passes along the primary path described by the transfer function $H_{PP}(s)$ 411 resulting in the observed disturbance d(t). The analog output signal y(t) interferes with the disturbance d(t) resulting in an analog playback signal s'(t) mixed with the residual noise e(t). The mixed signal is converted to a digital signal s'(n)+e(n) The playback signal s(n) is processed with the SP model, i.e. replica filter 430 described by the transfer function $\hat{H}_{SP}(z)$ resulting in the playback signal prediction $\hat{s}'(n)$. The playback signal prediction $\hat{s}'(n)$ is subtracted by the mixer 409*b* from the mixed signal leaving the residual noise e(n). The residual noise e(n) is sent to the FB ANC digital filter 420 having the transfer function $H_{FB}(z)$ (such as an IIR, FIR, Warped FIR filter or the like) resulting in the digital anti-noise signal $y_{FB}(n)$. The digital anti-noise signal $y_{FB}(n)$ is mixed by the mixer 409*a* with the digital playback signal s(n) resulting in the output digital signal y(n). The digital output signal y(n) passes along the secondary path described by the transfer function $H_{SP}(s)$ 413 resulting in the analog output signal y(t).

The goal of selecting, i.e. designing the filters of the FB ANC device 400 illustrated in FIGS. 6*a*, 6*b* and 7*a*, 7*b* is improving, in particular optimizing the noise sensitivity function to achieve good noise attenuation. The noise sensitivity function characterizes the noise attenuation capabilities of the FB ANC device 400 and may be represented as:

$$H_{FB}^{att}(z) = S(z) = \frac{1}{1 + H_{SP}(z) * H_{FB}(z)} \quad [3]$$

Figure 8:
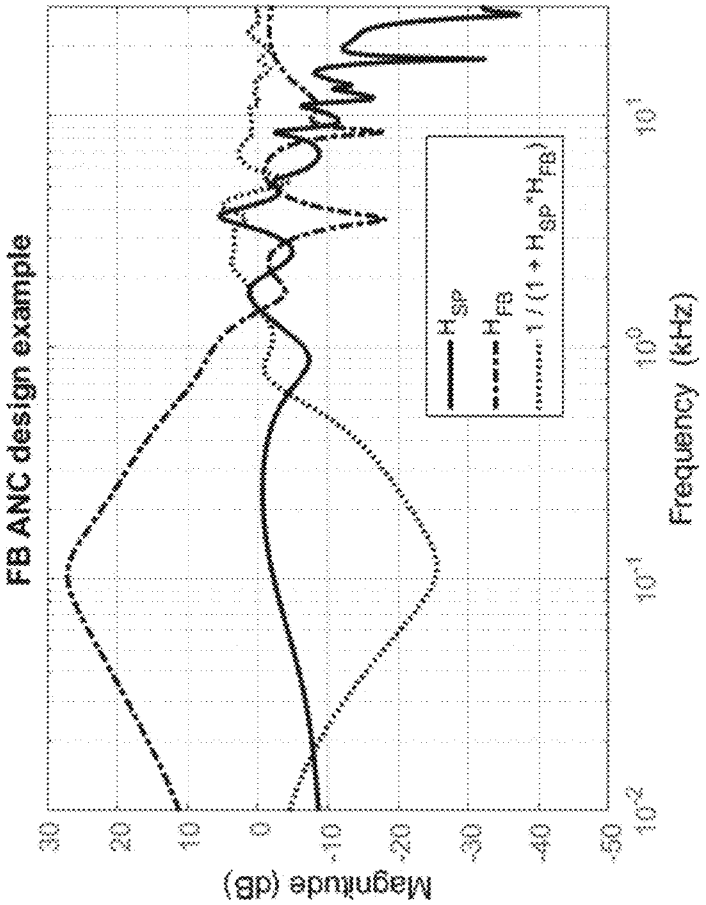
FIG. 8 shows as a function of frequency the magnitude responses of different transfer functions of a FB ANC filter of a HYBRID ANC device.

An FB ANC filter design (i.e. the magnitude responses of the transfer functions) for overhead headphones implementing a HYBRID ANC scheme (also referred to as Hybrid ANC scheme) is shown in FIG. 8.

Figure 9A:
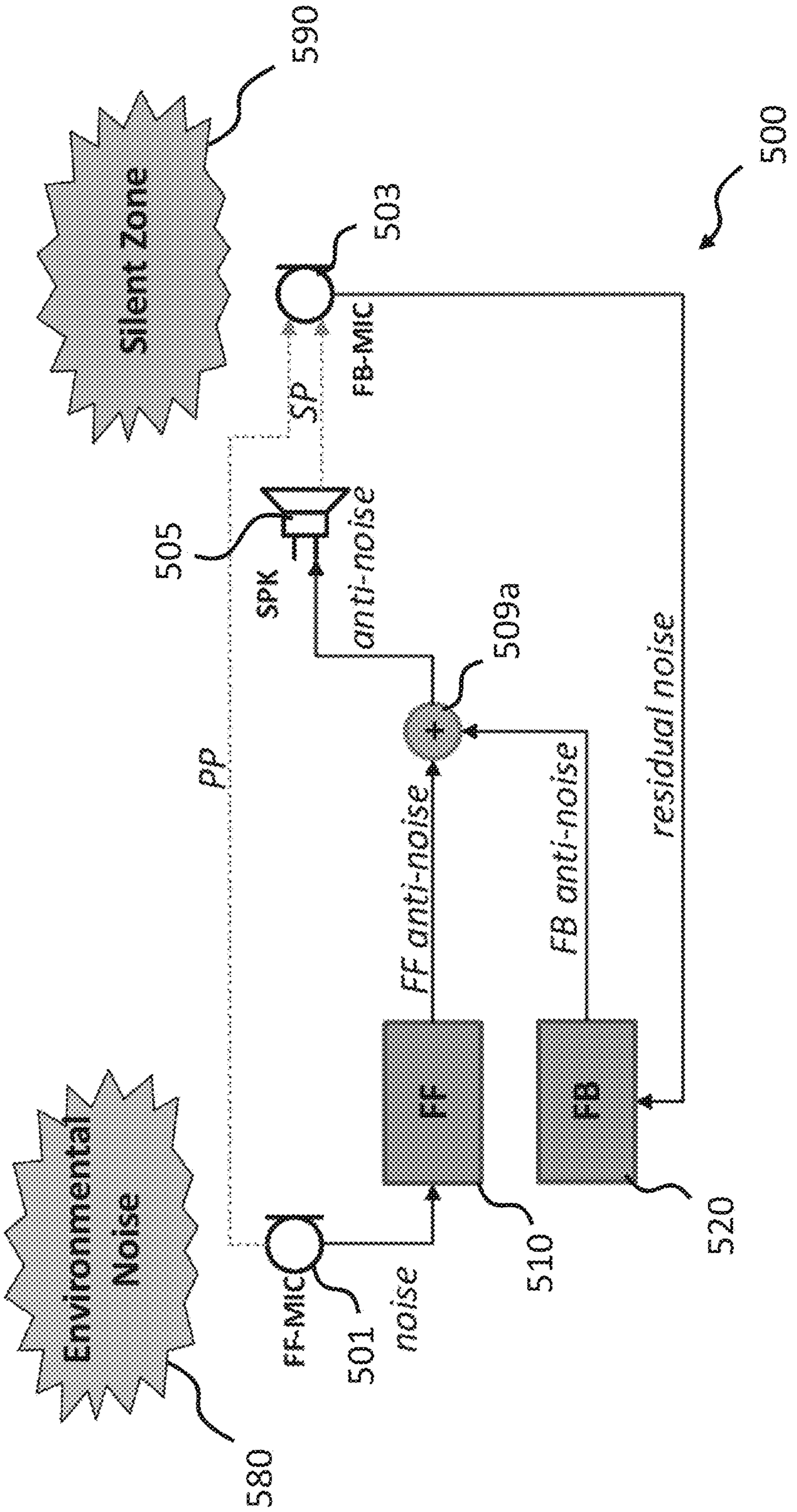
FIG. 9*a* is a schematic diagram illustrating the architecture of a HYBRID ANC device in the muted mode.

FIG. 9*a* shows a schematic diagram illustrating a corresponding ANC device 500 (also referred to as a HYBRID ANC device 500) combining a FF ANC scheme and a FB ANC scheme in the muted mode to achieve good attenuation at low frequency (FB ANC), while also extending the attenuation bandwidth (FF ANC). The main components of the HYBRID ANC device 500 are a FF-MIC 501, a FB-MIC 503, a speaker 505, a FF ANC filter 510 and an FB ANC filter 520. As will be appreciated from FIG. 9*a*, the HYBRID ANC device 500 implements the FF ANC filter 510 and the FB ANC filter 520 in parallel and uses the sum of their outputs (provided by a mixer 509*a*) as anti-noise.

Figure 9B:
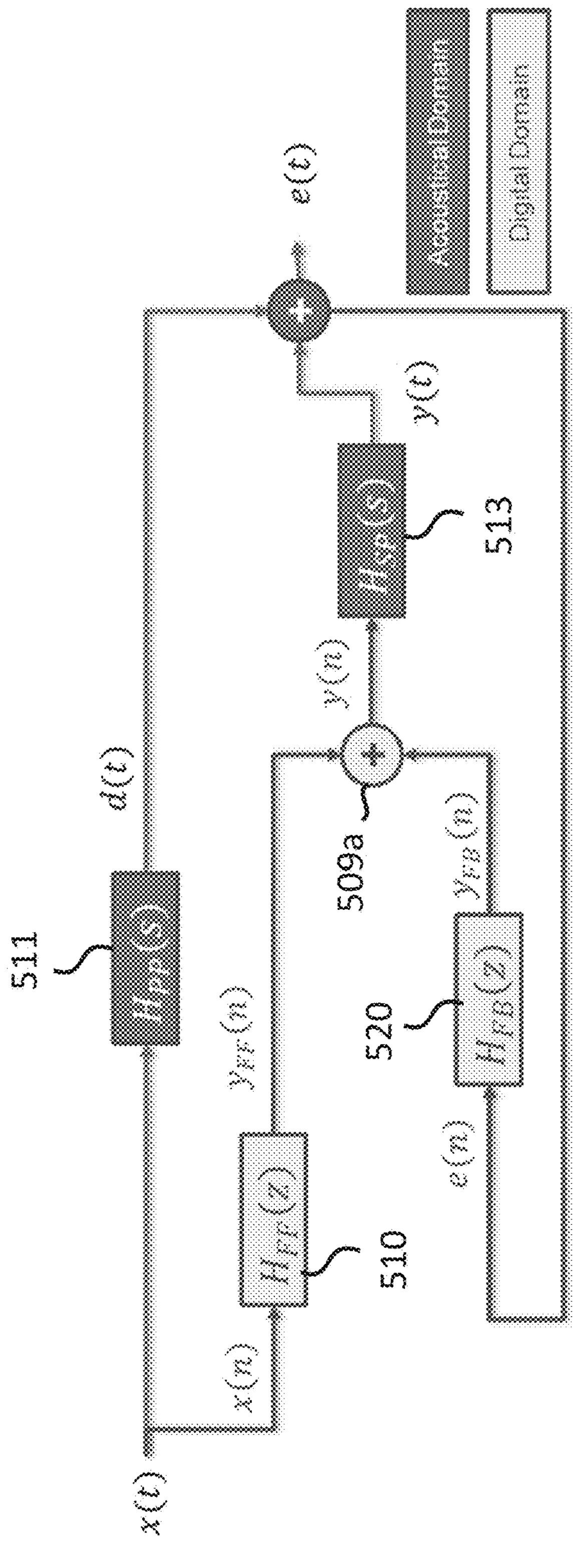
FIG. 9*b* is a schematic diagram illustrating aspects of the signal processing implemented by the HYBRID ANC device of FIG. 9*a;*

More specifically, a signal processing scheme implemented by the HYBRID ANC device 500 of FIG. 9*a* is shown in FIG. 9*b*. The noise x(t) passes along the primary path described by the transfer function $H_{PP}(s)$ 511 resulting in the observed disturbance d(t). The analog anti-noise signal y(t) interferes with the disturbance d(t) resulting in a residual noise e(t). The analog noise signal x(t) is converted to a digital noise signal x(n), which is used as input for the FF ANC filter 510 described by the transfer function $H_{FF}(z)$ (such as a IIR, FIR, Warped FIR filter or the like) to generate the FF ANC digital anti-noise $y_{FF}(n)$. The analog residual noise signal e(t) is converted to a digital residual noise signal e(n), which is used as input for the FB ANC filter 520 described by the transfer function $H_{FB}(z)$ (such as a IIR, FIR, Warped FIR filter or the like) to generate the FB ANC digital anti-noise signal $y_{FB}(n)$. The digital anti-noise signals $y_{FF}(n)$ and $y_{FB}(n)$ are summed by the mixer 509*a* resulting in a HYBRID ANC digital anti-noise signal y(n). The digital anti-noise signal y(n) passes along the secondary path described by the transfer function $H_{SP}(s)$ 513 producing the analog anti-noise signal y(t).

Figure 10A:
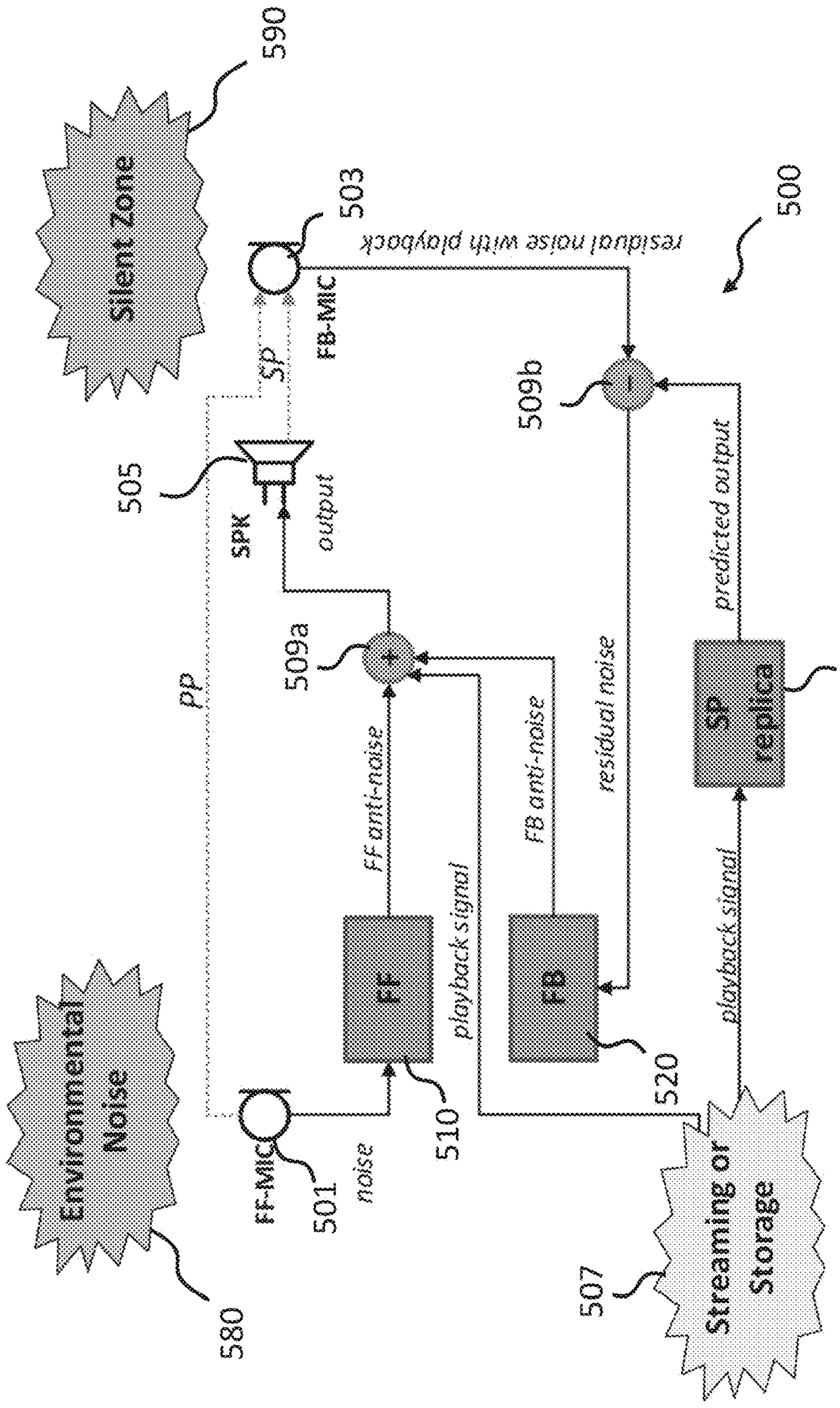
FIG. 10*a* is a schematic diagram illustrating the architecture of a HYBRID ANC device in the playback mode.

FIG. 10*a* shows a schematic diagram illustrating the HYBRID ANC device 500 combining a FF ANC scheme and a FB ANC scheme in the playback mode. As can be taken from FIG. 10*a*, the HYBRID ANC device 500 operating in the playback mode achieves the goal of non-destructive noise cancellation by using FB ANC in combination with FF ANC, which reduces FB ANC tuning efforts to achieve good performance. In addition to the components of the HYBRID ANC device 500 shown in FIGS. 9*a* and 9*b*, the HYBRID ANC device 500 shown in FIGS. 10*a* and 10*b* comprises a SP replica filter 530 for subtracting the playback signal from the input of the FB-MIC 501 to reduce its impairment by the FB ANC filter 520.

Figure 10B:
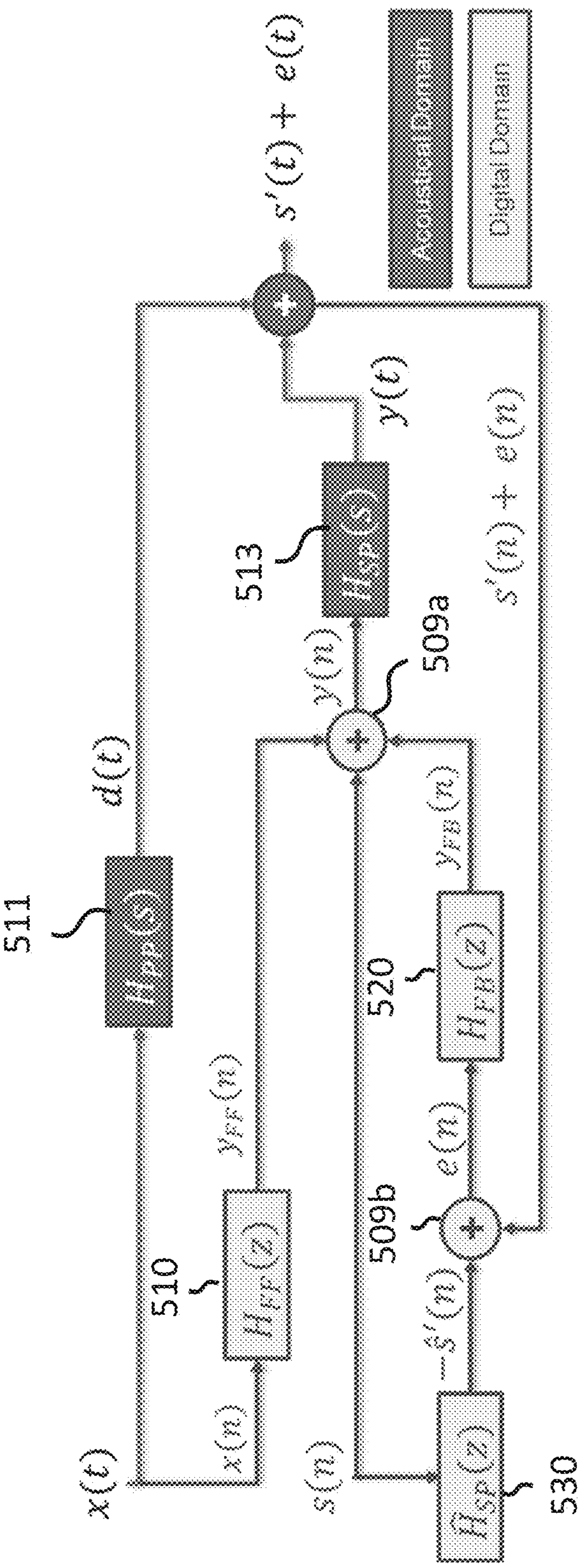
FIG. 10*b* is a schematic diagram illustrating aspects of the signal processing implemented by the HYBRID ANC device of FIG. 10*a;*

More specifically, a signal processing scheme implemented by the HYBRID ANC device 500 of FIG. 10*a* is shown in FIG. 10*b*. The noise x(t) passes along the primary path described by the transfer function $H_{PP}(s)$ 511 leading to the observed disturbance d(t). The analog signal y(t) interferes with the disturbance d (t) resulting in a residual noise mixed with the playback signal s'(t)+e(t). The analog noise signal x(t) is converted to the digital noise signal x(n), which is used as input for the FF ANC filter 510 described by the transfer function $H_{FF}(z)$ (such as an IIR, FIR, Warped FIR filter or the like) to generate the FF ANC digital anti-noise $y_{FF}(n)$. The playback digital signal s(n) is processed with the SP replica filter 530 described by the transfer function $\hat{H}_{SP}(z)$ resulting in the digital playback output prediction ŝ'(n). The analog signal s'(t)+e(t) is converted to the digital signal s'(n)+e(n), and the playback signal prediction is subtracted therefrom by the mixer 509*b* resulting in the digital residual noise signal e(n). The digital residual noise signal e(n) is used as input for the FB ANC filter 520 described by the transfer function $H_{FB}(z)$ (such as an IIR, FIR, Warped FIR filter or the like) to generate the FB ANC digital anti-noise signal $y_{FB}(n)$. The digital anti-noise signals $y_{FF}(n)$ and $y_{FB}(n)$ and the playback signal s(n) are summed by the mixer 509*a* resulting in an mixed output signal y(n). The digital anti-noise signal y(n) passes along the secondary path described by the transfer function $H_{SP}(t)$ 513 producing the analog anti-noise y(t).

For the HYBRID ANC device 500 illustrated in FIGS. 9*a*, 9*b* and 10*a*, 10*b* the goal of selecting, i.e. designing the filters of the FF ANC processing branch is the approximation of the primary path (PP) by the FF filter output passed along the secondary path (SP), which can be represented using digital models of PP $H_{PP}(z)$ and SP $H_{SP}(z)$ as Eq. [1].

For modeling the PP a low-pass filter may be used with a cut-off frequency determined by the geometric shape of the HYBRID ANC device 500 as well as the environment, while the SP is a low-pass filter with a much higher cut-off frequency than for the PP, which is defined by the acoustical design and the placement of the FB-MIC 503. Thus, the FF ANC filter 510 generally matches a low-pass filter with a cut-off frequency and a roll-off rate depending on the PP shape. An FF ANC filter design (i.e. the magnitude responses of the transfer functions) for overhead headphones implementing HYBRID ANC matches the FF ANC device 300 design and is shown in FIG. 5 already described above.

The goal of selecting, i.e. designing the filters of the FB ANC processing branch of the HYBRID ANC device 500 illustrated in FIGS. 9*a*, 9*b* and 10*a*, 10*b* is improving, in particular optimizing the noise sensitivity function to achieve good noise attenuation. The noise sensitivity function characterizes the noise rejection capabilities of the FB ANC processing branch of the HYBRID ANC device 500 and may be represented by Eq. [3] above.

An FB ANC filter design (i.e. the magnitude responses of the transfer functions) for overhead headphones implementing a HYBRID ANC scheme matches the corresponding design for the FB ANC device 400, as shown in FIG. 8.

Ideally, for the HYBRID ANC device 500 with the FF ANC filter 510 active and the FB ANC filter 520 active the expected noise transfer function from the FF-MIC 501 to the FB-MIC 503 is given by:

$$H_{Hybrid}^{att}(z) = (H_{pp}(z) - H_{SP}(z) * H_{FF}(z)) * S(z) = \frac{(H_{pp}(z) - H_{SP}(z) * H_{FF}(z))}{1 + H_{SP}(z) * H_{FB}(z)} \quad [4]$$

Figure 11:
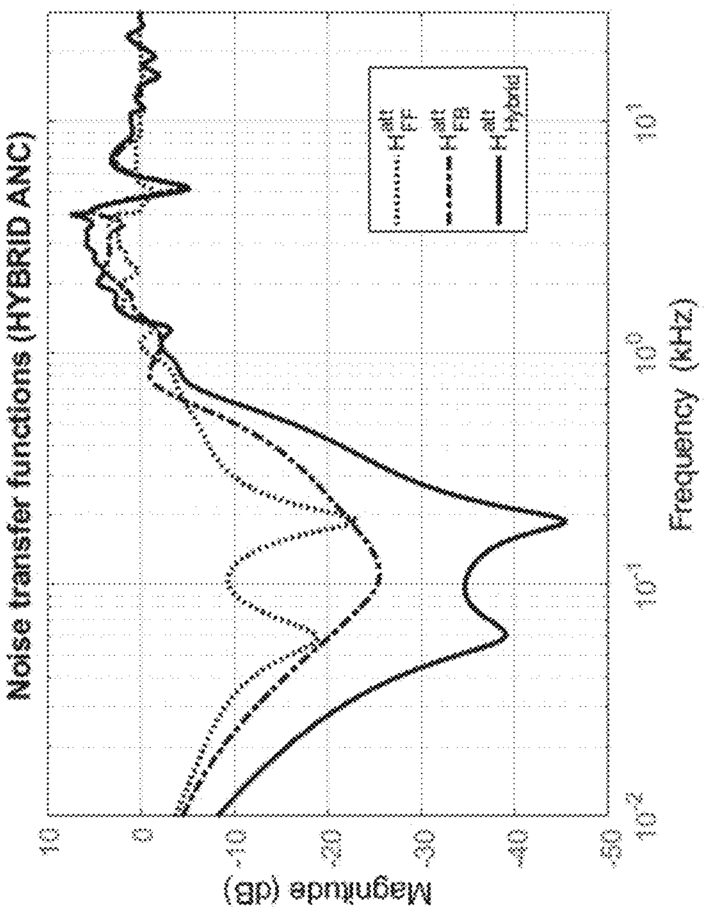
FIG. 11 shows as a function of frequency the magnitude responses of different noise transfer functions of a HYBRID ANC device.

Exemplary expected HYBRID ANC device noise transfer functions for overhead headphones are shown in FIG. 11.

Though mathematically the expected performance defined in equation Eq. [4] means that both the FF ANC branch and the FB ANC branch act simultaneously, in fact, the HYBRID ANC device 500 works in the following way: foremost the FB ANC filter branch 520 introduces a negative loopback altering the SP function and attenuating disturbances injected at the FB-MIC 503, whereafter the FF ANC filter branch 510 injects anti-noise to the altered SP.

As will be appreciated, the negative loopback introduced with the FB ANC processing branch modifies the SP for the FF ANC processing branch as well as for the playback signal. The modified SP function with FB ANC loopback can be described as:

$$\tilde{H}_{SP}(z) = \frac{H_{SP}(z)}{1 + H_{SP}(z) * H_{FB}(z)} \quad [5]$$

The PP transfer function after disturbances are attenuated by the FB ANC branch of the HYBRID ANC device 500 can be described as:

$$\tilde{H}_{PP}(z) = \frac{H_{PP}(z)}{1 + H_{SP}(z) * H_{FB}(z)} \quad [6]$$

Figure 13:
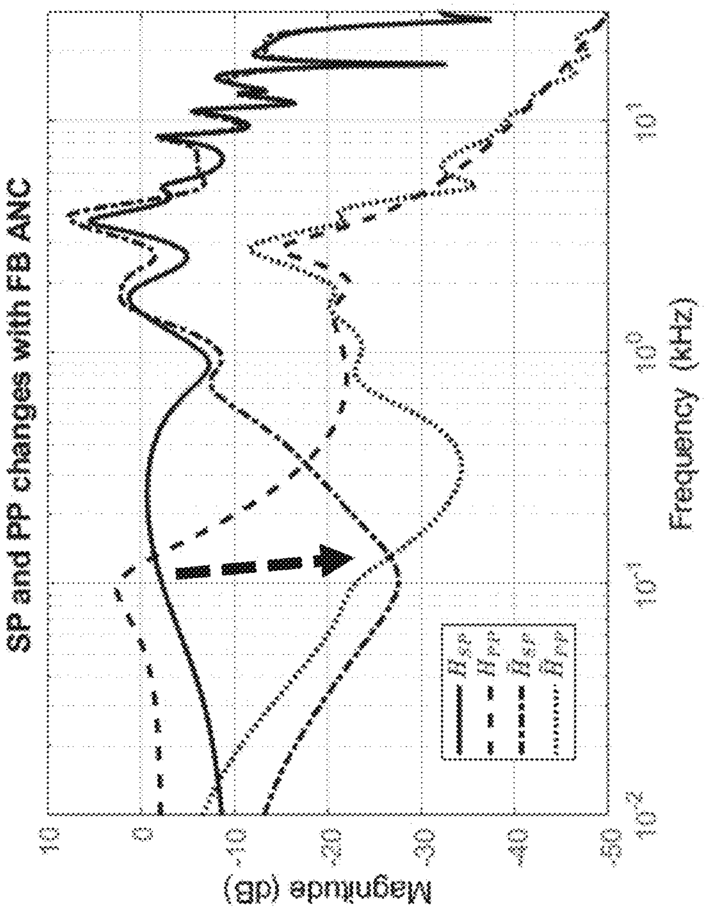
FIG. 13 shows as a function of frequency the magnitude responses of different transfer functions of a FB ANC filter of a HYBRID ANC device with a modification of the secondary transfer path.

The corresponding changes of the SP and PP magnitude response are shown in FIG. 13.

Figure 12:
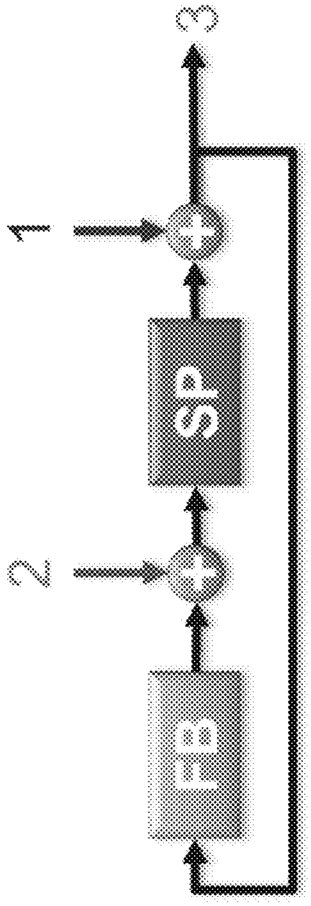
FIG. 12 is a schematic diagram illustrating the feedback inputs in a HYBRID ANC device.

Once a HYBRID ANC device 500 with adjusted SP and PP functions is considered, there are two signal injection points, as shown in the schematic illustration of FIG. 12. The first point 1 is the noise and disturbances input characterized by the sensitivity transfer function defined in Eq. [3] above. The second point 2 is the playback signal and the FF ANC anti-noise injection point.

Considering the FF ANC anti-noise generation in the silent zone 590, it will be appreciated that for the HYBRID ANC device 500 the expected anti-noise generation function from the FF-MIC 501 to the FB-MIC 503 is changed due to the SP function modification as follows:

$$H_{FF}(z) = H_{SP}(z) \to H_{FF}(z) * \tilde{H}_{SP}(z) = \frac{H_{FF}(z) * H_{SP}(z)}{1 + H_{SP}(z) * H_{FB}(z)} \quad [7]$$

From a mathematical point of view there should be no problem with such change, because of the symmetric PP modification and the FF ANC fulfilled due to fractions reduction:

$$H_{FF}(z) = -\frac{H_{PP}(z)}{H_{SP}(z)} \to \tilde{H}_{FF}(z) = \quad [8]$$

$$-\frac{\tilde{H}_{PP}(z)}{\tilde{H}_{SP}(z)} = -\frac{\frac{H_{PP}(z)}{1 + H_{SP}(z) * H_{FB}(z)}}{\frac{H_{SP}(z)}{1 + H_{SP}(z) * H_{FB}(z)}} = -\frac{H_{PP}(z)}{H_{SP}(z)} = H_{FF}(z)$$

Figure 14:
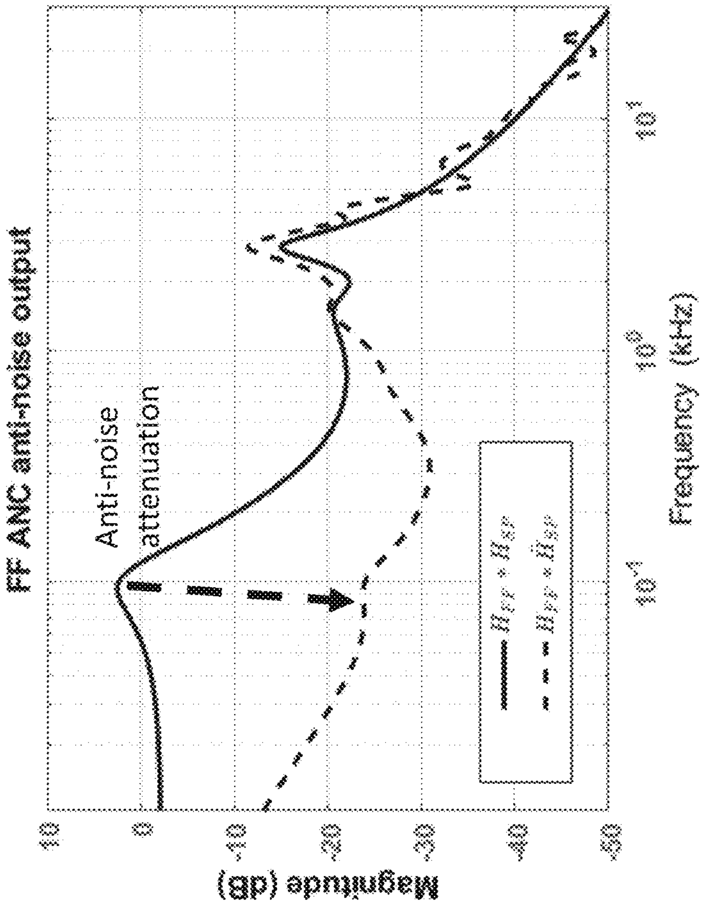
FIG. 14 illustrates the FF ANC anti-noise attenuation in a HYBRID ANC device.

However, such a reduction may not be correct from a physical point of view. Comparing the changes between $H_{SP}(z)$ and $\tilde{H}_{SP}(z)$ in the HYBRID ANC device 500, it will be appreciated that the FF ANC filter 510 output is attenuated while sent to the silent zone 590. In physical ANC devices this means losing of the least significant bits of the FF ANC output and an ineffective utilization of the most significant bits. The corresponding effect of the FF ANC anti-noise attenuation by $\tilde{H}_{SP}(z)$ is illustrated in FIG. 14. It is also worth to note, that the design and the processing of the FF ANC filter 510 is a challenging task requiring high-precision computations. As a consequence, losing its output accuracy due to FB ANC attenuation complicates its design and limits its achievable performance.

Usually, the dynamic range available for the FF ANC filter 510 of the HYBRID ANC device 500 is limited by one or more of the following physical properties/parameters: (i) the signal-to-noise ratio (SNR) of the FF-MIC 501 characterizing the minimum applicable noise level; (ii) the dynamic ranges of the FF ANC digital filter input, coefficients, states, and output; and (iii) the sensitivity of the SPK 505 characterized by the sound pressure provided by the loudspeaker 505 in response to input voltage, i.e. the loudspeaker driving signal. Moreover, as will be appreciated, in the HYBRID ANC device 500 attenuation of the FF ANC output with a modified SP hardens requirements with respect to the hardware design of the HYBRID ANC device 500 and impairs the performance of the FF ANC filter 510.

As already described above, the main idea of playback signal compensation is to make a SP modification with FB ANC loopback transparent from the point of view of the playback signal. This is achieved by introducing a SP replica transfer function $\hat{H}_{SP}(z)$, as described above in the context of FIGS. 10*a* and 10*b*, to subtract the expected playback signal output from the input signal of the FB-MIC 503, and leads to playback transfer function $H_{SP}^{play}(z)$:

$$H_{SP}^{play}(z) = \frac{H_{SP}(z)}{1 + \left(H_{SP}(z) - \hat{H}_{SP}(z)\right) * H_{FB}(z)} \xrightarrow{H_{SP} = \hat{H}_{SP}} H_{SP}(z) \quad [9]$$

Figure 15:
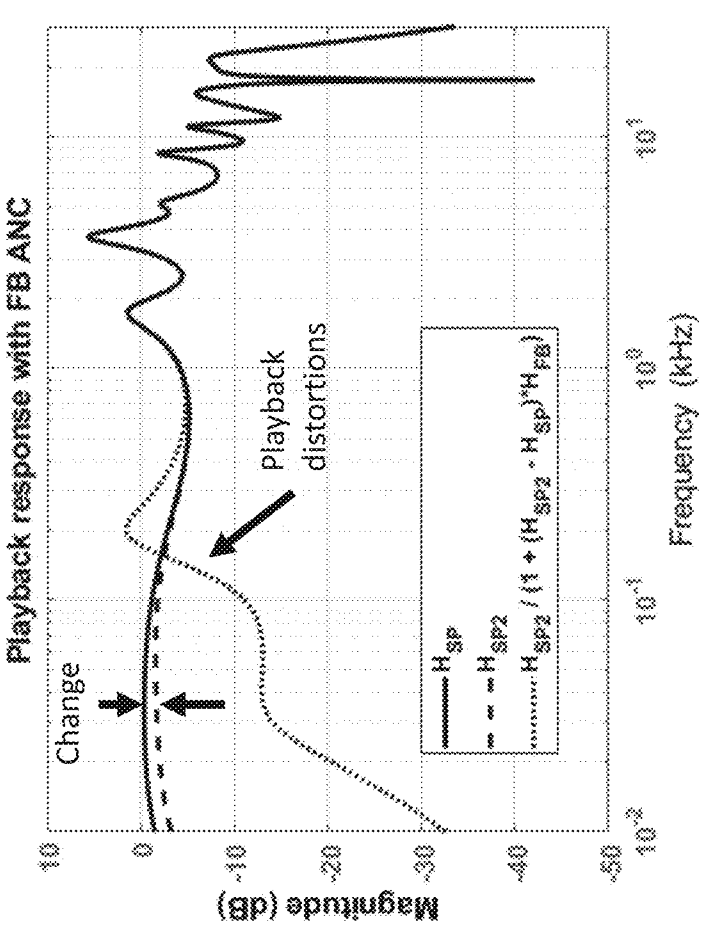
FIG. 15 illustrates the playback impairment in a HYBRID ANC device.

However, even a minor mismatch between the SP replica transfer function and the actual SP transfer function can lead to noticeable impairment of the playback signal, which is illustrated by FIG. 15. As can be taken from FIG. 15, even minor changes of the SP ($H_{SP2}$–SP with 0-2 dB attenuation at frequencies below 300 Hz) in the working frequency range of the FB ANC filter 520 can lead to a dramatical playback path attenuation. It is worth to note that SP can noticeably change depending on a particular device sample or usage environment.

Figure 16:
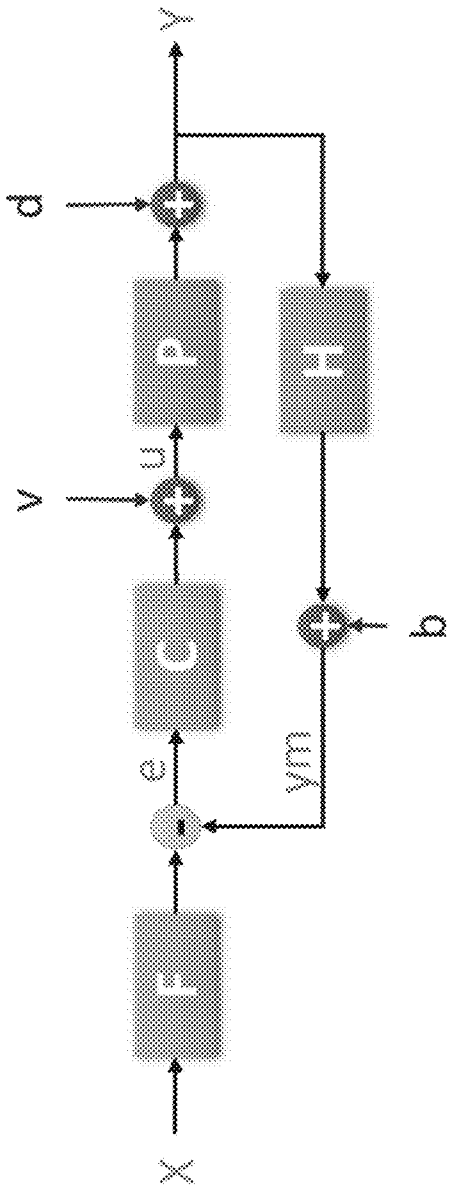
FIG. 16 is a schematic diagram illustrating the general architecture of a feedback control system (FCS)

In the following, embodiments will be described in more detail. As will be appreciated from FIG. 16 and will be described in more detail below, embodiments implement a chained ANC architecture, where the FB ANC filter is used as a feedback controller. FIG. 16 is a schematic diagram illustrating the general architecture of a chained ANC device according to an embodiment as a feedback control system (FCS). In the FCS architecture shown in FIG. 16, X denotes the desired trajectory pre-shaped with an input filter F. A processing circuitry, e.g. controller C uses the difference e between the observed plant P output ym and the desired trajectory to generate control signal u, which makes plant to follow the desired trajectory.

In the FCS architecture illustrated in FIG. 16 the following signals are considered as disturbances: the output noise d, the sensor noise b, and the control signal disturbance v. Sensor noise b is typically indistinguishable from the input signal and cannot be attenuated. At the same time, one of the main FCS design goals is making it tolerant to both output noise d and a control signal disturbance v.

Figure 17:
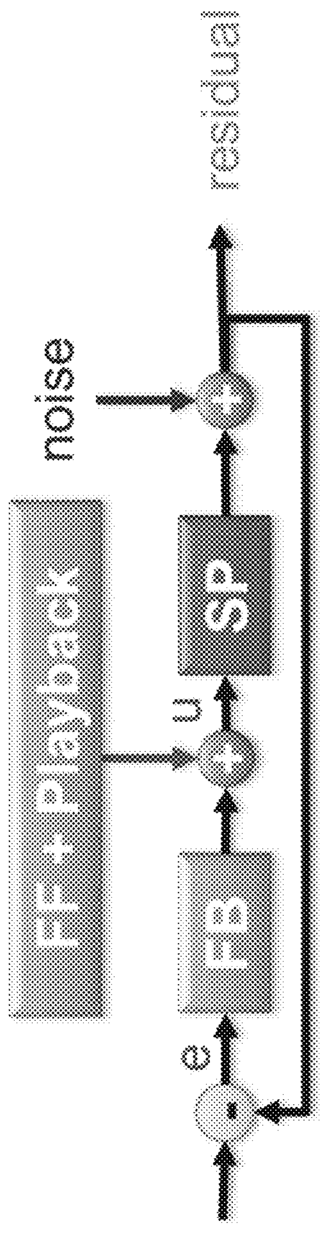
FIG. 17 is a schematic diagram illustrating the HYBRID ANC device architecture as a FCS.

Comparing the general architecture of the FCS shown in FIG. 17 with the architecture of the HYBRID ANC device 500 described above it will be appreciated that for the FB ANC processing branch both the anti-noise generated with the FF ANC filter 510 and the playback signal are considered as disturbances. Thus, their attenuation is an inevitable FB ANC property by design. At the same time the input signal is zero, and the goal of the FB ANC processing branch is to reduce the output noise so that it can be tracked.

Figure 18:
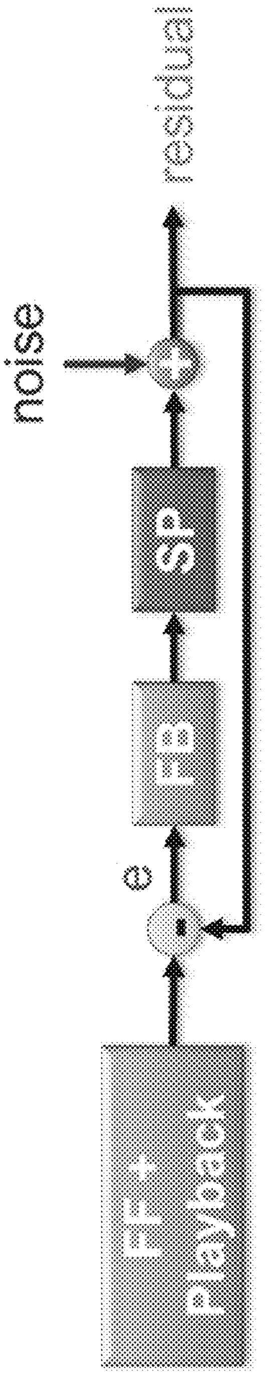
FIG. 18 is a schematic diagram illustrating the feedback control architecture of an ANC device according to an embodiment with a chained ANC architecture.

As illustrated in FIG. 18, embodiments are based on the idea of reducing the impact of the FB ANC filter 520 on the FF ANC output and playback signals by exploiting the FCS property of input signal tracking and stabilization and making it track inputs by reducing noise and stabilizing instead of attenuating them. In that case, FCS design methods can be naturally applied to provide both inputs tracking and noise tolerance without impairment of the FF ANC filter and playback signal by the FB ANC filter.

Figure 19A:
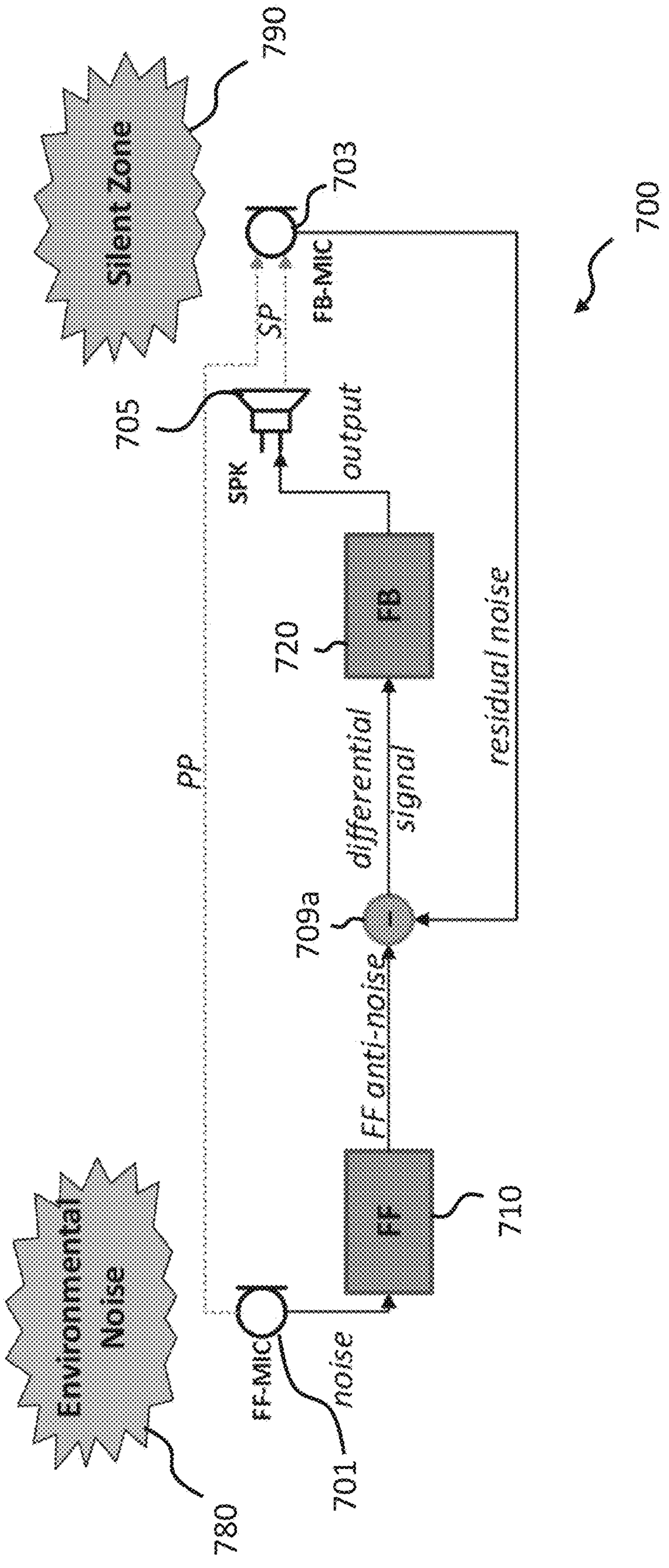
FIG. 19*a* is a schematic diagram illustrating the architecture of an ANC device according to an embodiment with a chained ANC architecture in the muted mode.

FIG. 19*a* shows a schematic diagram illustrating an ANC device 700 according to an embodiment implementing a chained ANC architecture operating in the muted mode. As will be described in the context of FIG. 19*b* in more detail below, the ANC device 700 comprises a first microphone in the form of a FF-MIC 701 configured to generate a first microphone signal x(n), i.e. the noise signal in response to an external first acoustic noise in a first zone 780 of the ANC device 700. The ANC device 700 further comprises a cancelling loudspeaker SPK 705 configured to be driven with a loudspeaker signal y(n). Moreover, the ANC device 700 comprises a second silent zone microphone in the form of a FB-MIC 703 configured to generate a second microphone signal, wherein the second microphone signal comprises a residual noise component e(n) based on a residual second acoustic noise in the silent zone 790 of the ANC device 700. Moreover, the ANC device 700 comprises a processing circuitry configured to generate using a first filter in the form of a FF ANC filter 710 a compensation, i.e. noise reduction or cancellation signal (FF anti-noise; $y'_{FF}(n)$) based on the first microphone signal x(n). The processing circuitry is further configured to generate using a second filter in the form of a FB ANC filter 720 the loudspeaker signal, i.e. anti-noise signal y(n) based on the compensation signal (FF anti-noise) $y'_{FF}(n)$ and the second microphone signal including the residual noise component e(n).

The processing circuitry of the ANC device 700 (or any other embodiment or processing circuitry described herein) may be implemented in or using hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. The ANC device 700 may further comprise a non-transitory memory configured to store data and executable program code which, when executed by the processing circuitry of the ANC device 700 causes the ANC device 700 to perform the functions, operations and methods described herein.

As can be taken from FIG. 19*a*, the chained ANC architecture implemented by embodiments combines the FF ANC filter 710 and the FB ANC filter 720 in a queue like in the generic FCS shown in FIG. 16. Advantageously, this leads to an improved FF ANC anti-noise stability supported by the FB ANC filter 720 without any unexpected attenuation. In the embodiment shown in FIG. 19*a*, the FF ANC filter 710 processes the observed environmental noise 780 and sends it to the silent zone 790 and is configured to predict the noise transfer. The FB ANC filter 720 provides a stable transfer path for the FF ANC filter 710 and reduces residual noise, which is acquired as the difference between the predicted FF ANC anti-noise and the actually observed noise in the silent zone 790.

Figure 19B:
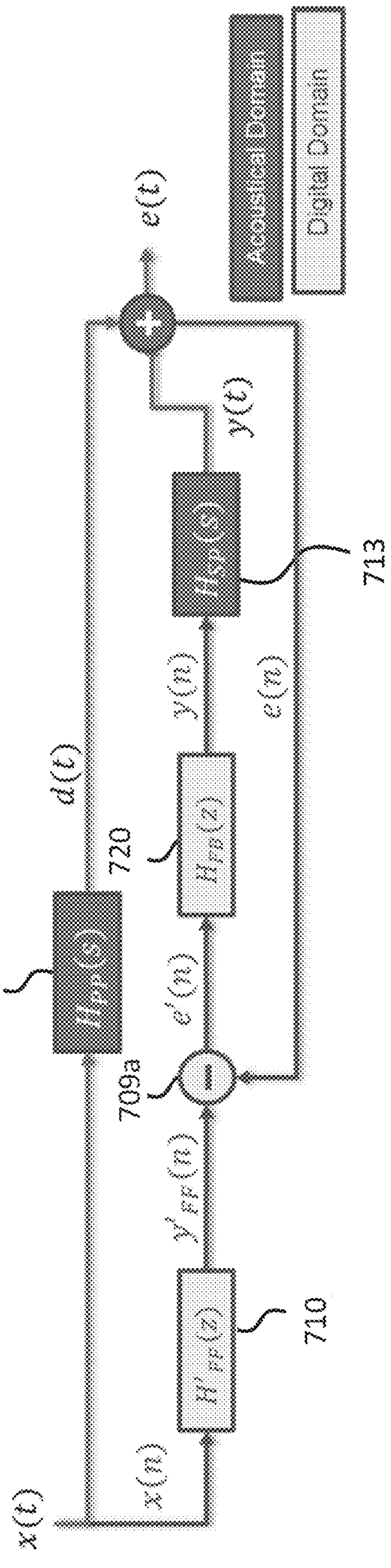
FIG. 19*b* is a schematic diagram illustrating aspects of the signal processing implemented by the ANC device of FIG. 18*a;*

More specifically, a signal processing scheme implemented by the embodiment of the chained ANC device 700 of FIG. 19*a* is shown in FIG. 19*b*. The noise x(t) passes along the primary path described by the transfer function $H_{PP}(s)$ 711 leading to the observed disturbance d(t). The noise x(t) is converted to the digital noise signal x(n), which is processed with the FF ANC digital filter 710 (which in an embodiment may be implemented as a IIR, FIR, Warped FIR filter or the like) with the transfer function $H_{FF}(z)$ resulting in the FF ANC anti-noise digital signal $y_{FF}(n)$ The destructive interference of the disturbance d(t) and the disturbance compensation y(t) at the silent zone 790 of the ANC device 700 results in the residual noise e(t). The residual noise e(t) is converted to the digital signal e(n) and subtracted from the FF ANC anti-noise signal $y_{FF}(n)$ resulting in the differential signal e'(n) representing the residual distortions after the destructive interference at the silent zone 790. The differential signal e' (n) is processed with the FB ANC digital filter 720 (which in an embodiment may be implemented as a IIR, FIR, Warped FIR filter or the like) with the transfer function $H_{FB}(z)$ resulting in the digital anti-noise signal y(n). The digital anti-noise signal y(n) propagates along the SP transfer path described by the transfer function $H_{SP}(s)$ 713 resulting in the analog anti-noise signal y(t) participating in the destructive interference in the silent zone 790.

As will be appreciated, for the chained ANC device 700 of FIGS. 19*a* and 19*b* operating in the muted mode the differential signal e'(n) can be considered as the instant deviation of the output of $H_{SP}(s)$ from the desired trajectory, which in this case is determined by the FF ANC anti-noise $y'_{FF}$. The FB ANC filter 720 acts as an integrator accumulating the differential signal and sending it to the output with an inverse sign.

Figure 20A:
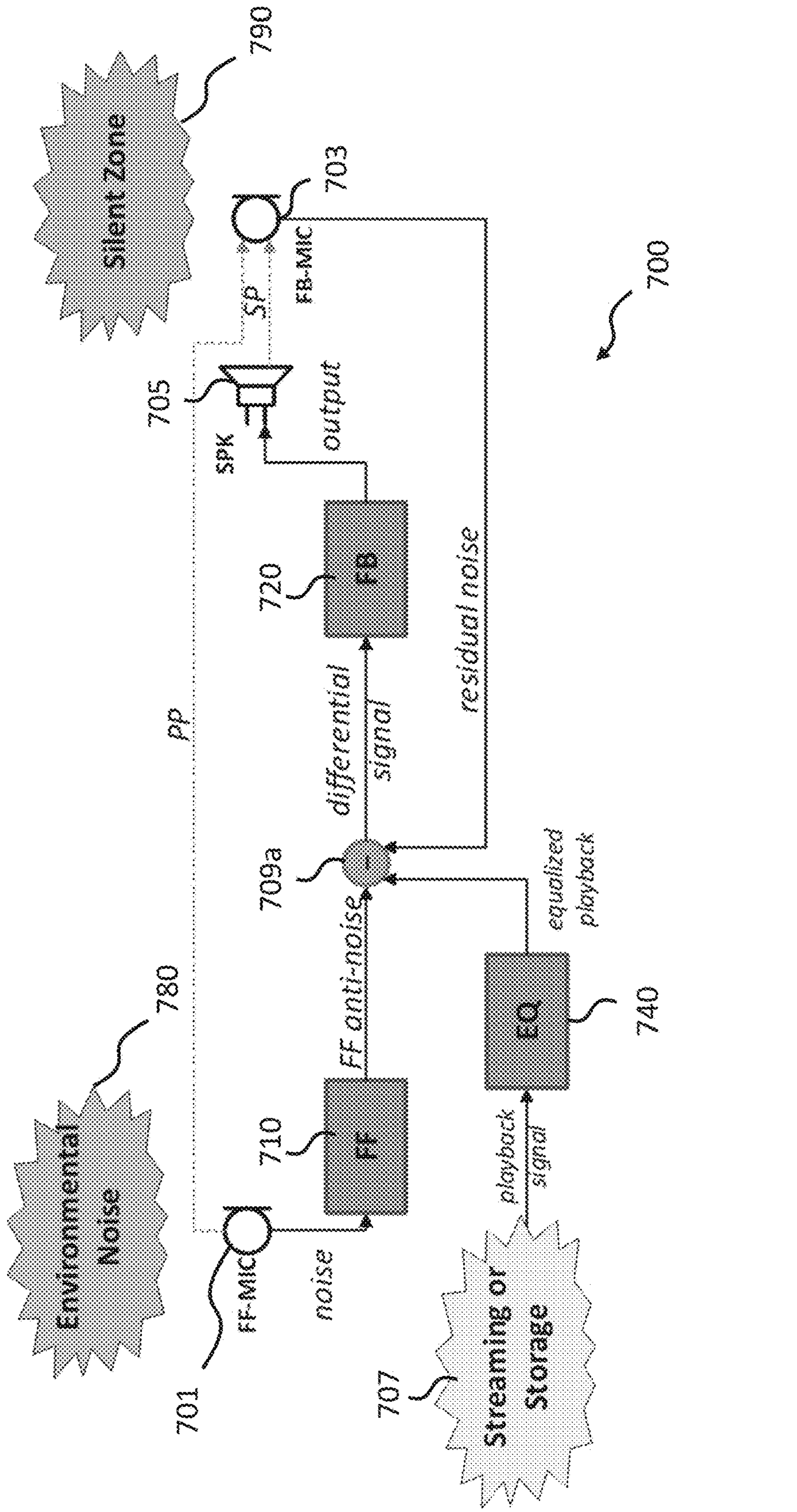
FIG. 20*a* is a schematic diagram illustrating the architecture of an ANC device according to an embodiment with a chained ANC architecture in the playback mode.

FIG. 20*a* shows a schematic diagram illustrating the ANC device 700 according to a further embodiment implementing a chained ANC architecture operating in the playback mode, wherein the playback signal may be, for instance, streamed from a cloud server or retrieved from a data storage of the ANC device 700, as illustrated by the reference sign 707 in FIG. 20*a*. As can be taken from FIG. 20*a*, in addition to the components of the embodiment of the ANC device 700 illustrated in FIGS. 19*a* and 19*b* the embodiment of the ANC device 700 shown in FIGS. 20*a* and 20*b* may further comprise an equalizer (EQ) 740 configured to equalize the playback signal to be mixed by a mixer 709*a* with the anti-noise from the FF ANC filter 710. The resulting desired signal is provided to the FB ANC filter 720 (like in the generic FCS shown in FIG. 16), which prevents playback signal distortions and FF ANC attenuation by the FB ANC filter 720. Advantageously, the equalizer 740 applied to the playback signal may result in a flat frequency response from the playback input to the speaker output with higher frequencies attenuated, which is different from the target playback response in most common applications. Moreover, the embodiment of the ANC device 700 implementing the chained ANC architecture operating in the playback mode may provide a stable SP for playback with no requirement for additional compensation.

Figure 20B:
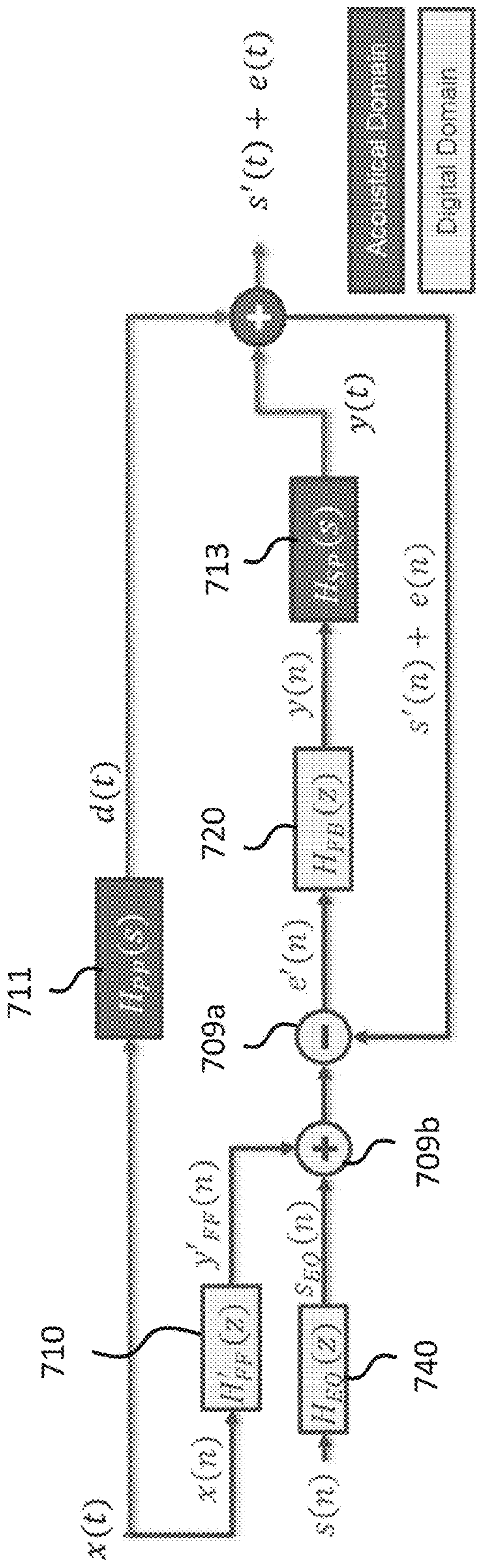
FIG. 20*b* is a schematic diagram illustrating aspects of the signal processing implemented by the ANC device of FIG. 19*a;*

A signal processing scheme implemented by the embodiment of the chained ANC device 700 of FIG. 20*a* is shown in FIG. 20*b*. The noise x(t) passes along the primary path described by the transfer function $H_{PP}(s)$ 711 leading to the observed disturbance d . The noise x(t) is converted to a digital signal x(n), which is processed with the FF ANC digital filter 710 (which in an embodiment may be implemented as an IIR, FIR, Warped FIR filter or the like) having the transfer function $H_{FF}(z)$ resulting in the FF ANC anti-noise digital signal $y_{FF}(n)$. In the embodiments shown in FIGS. 20*a* and 20*b*, the playback signal s(n) is pre-processed with the pre-shaping equalizer 740 having a transfer function $H_{EQ}(z)$ resulting in the playback digital input for the chained ANC, i.e. the signal $s_{EQ}(n)$. The destructive interference of the disturbance d(t) and the output signal y(t) in the silent zone 790 results in the analog playback signal s'(t) (i.e. the desired output) mixed with the residual noise e(t). The output signal mixture s'(t)+e(t) is converted to the digital signal s'(n)+e(n). The digital signal s'(n)+e(n) is subtracted from the sum of the FF ANC anti-noise $y_{FF}(n)$ and the playback signal $s_{EQ}(n)$ resulting in the differential signal e'(n). The differential signal e'(n) is processed with the FB ANC digital filter 720 (which in an embodiment may be implemented as an IIR, FIR, Warped FIR filter or the like) described by the transfer function $H_{FB}(z)$ resulting in the digital signal y(n). The digital signal y(n), in turn, is played through the SP transfer path described by the transfer function $H_{SP}(s)$ 713 resulting in the analog anti-noise signal y(t) participating in the destructive interference.

As will be appreciated, for the embodiment of the chained ANC device 700 of FIGS. 20*a* and 20*b* operating in the playback mode the differential signal e'(n) can be considered as the instant deviation of the output of $H_{SP}(s)$ from the desired trajectory, which in this case is determined by the sum of the FF ANC anti-noise $y'_{FF}$ and the playback signal $s_{EQ}$. As already described above, the FB ANC filter 720 acts as an integrator accumulating the differential signal and sending it to output with inverse sign.

Thus, to summarize, in an embodiment the role of the FB ANC filter 720 of the ANC device 700 is that of an inverting integrator. The FF ANC branch processing is a noise-prediction digital filter using a stabilized SP. The playback equalizer 740 is a digital filter exploiting stabilized SP to achieve the desired frequency response for the playback signal regardless of actual SP deviations and output disturbances. Additionally, the equalizer 740 of the ANC device 700 may compensate for the SP attenuation at higher frequencies that may result from bandwidth limitations of the FB ANC filter 720.

In an embodiment, the different filters of the embodiment of the chained ANC device 700 for muted mode operation of FIGS. 19*a*, 19*b* and the embodiment of the chained ANC device 700 for playback mode operation of FIGS. 20*a*, 20*b* may be designed to approximate the PP by the FF ANC filter 710 convolved with the SP (more specifically, their respective transfer functions). In further embodiments of the chained ANC device 700 the design of the FF ANC filter 710 may explicitly take into account for the SP and the PP any changes introduced by the FB ANC filter 720.

In the following one embodiment for an optimized filter design is described in more detail. In an embodiment, the optimization of the FF ANC filter 710 of the ANC device 700 may be based on the following equation:

$$H'_{PP}(z)=-H'_{FF}(z)*H_{SP}(z) \quad [10]$$

where:

$$H'_{pp}(z) = H_{PP}(z) * S(z) = \frac{H_{PP}(z)}{1 + H_{SP}(z) * H_{FB}(z)} \quad [11]$$

$$H'_{SP}(z) = \frac{H_{SP}(z) * H_{FB}(z)}{1 + H_{SP}(z) * H_{FB}(z)} \quad [12]$$

Taking into account Eqs. [10] and [11] the optimization can be written as:

$$H'_{FF}(z) = -\frac{H_{PP}(z)}{H_{SP}(z) * H_{FB}(z)} \quad [13]$$

Figure 21:
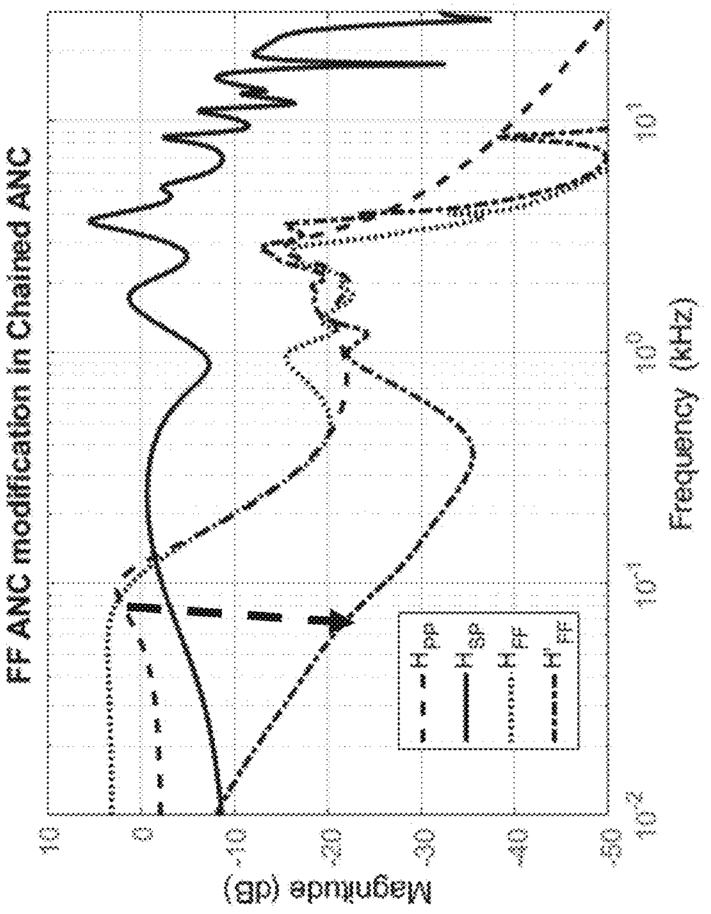
FIG. 21 illustrates aspects of the design of a FF ANC filter of an ANC device according to an embodiment with a chained ANC architecture.
Figure 22:
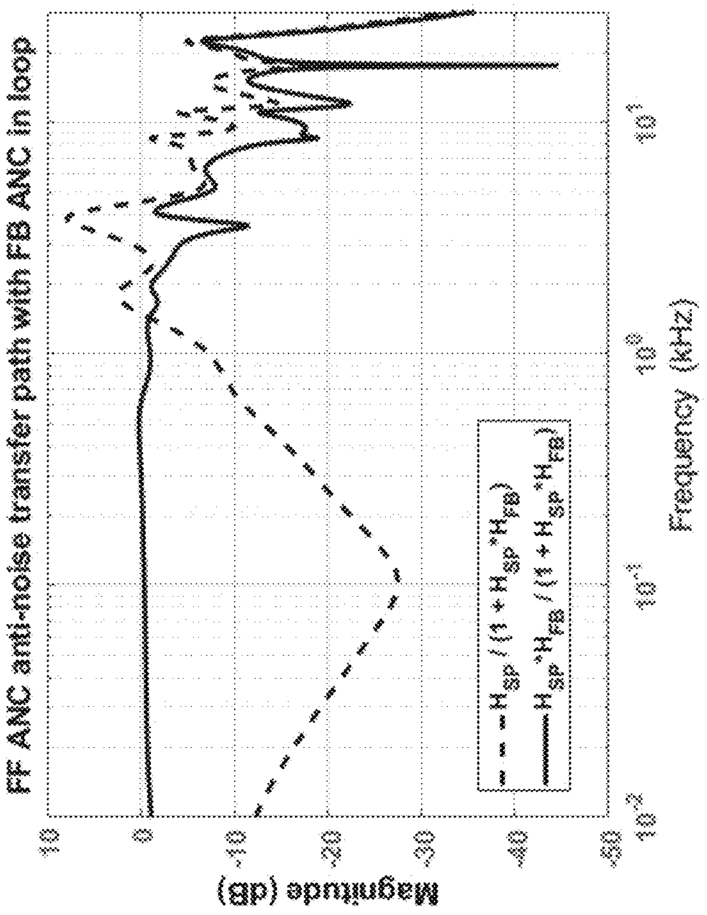
FIG. 22 illustrates aspects of the transfer path of the FF ANC filter of an ANC device according to an embodiment with a chained ANC architecture.

FIG. 21 shows several graphs of the respective magnitude of the transfer function involved in Eq. [12] as a function of frequency for the chained ANC device 700 in the form of overhead headphones. In comparison with the same graphs for the FF ANC device illustrated above, the FF ANC transfer function design goal may be explicitly attained by embodiments of the ANC device 700, which allows, for instance, an adjustment of the sensitivity of the FF-MIC 701 and/or the digital filters to fit any allowed dynamic ranges. Another advantage provided by embodiments of the ANC device 700 in comparison with the HYBRID ANC device 500 described above is the nearly flat and stabilized transfer path $H'_{SP}(z)$ in the $H_{FB}(z)$ frequency range, as illustrated in FIG. 22. This allows considering $H'_{SP}(z)$ to be approximately equal to a unity gain and may reduce efforts for training, i.e. adapting the FF ANC filter 720.

As already described above, in the playback mode one of the main goals of the ANC device 700 may be to minimize useful signal distortions by the FB ANC filter 720 due to changes of the SP. Instead of subtracting the useful signal prediction from the FB-MIC input as it is done in the HYBRID ANC device 500 described above, according to an embodiment the ANC device 700 is configured to mix the playback signal with the FF ANC anti-noise and send the combination to the FB ANC filter 720 acting as the FCS, as already described above.

Figure 23:
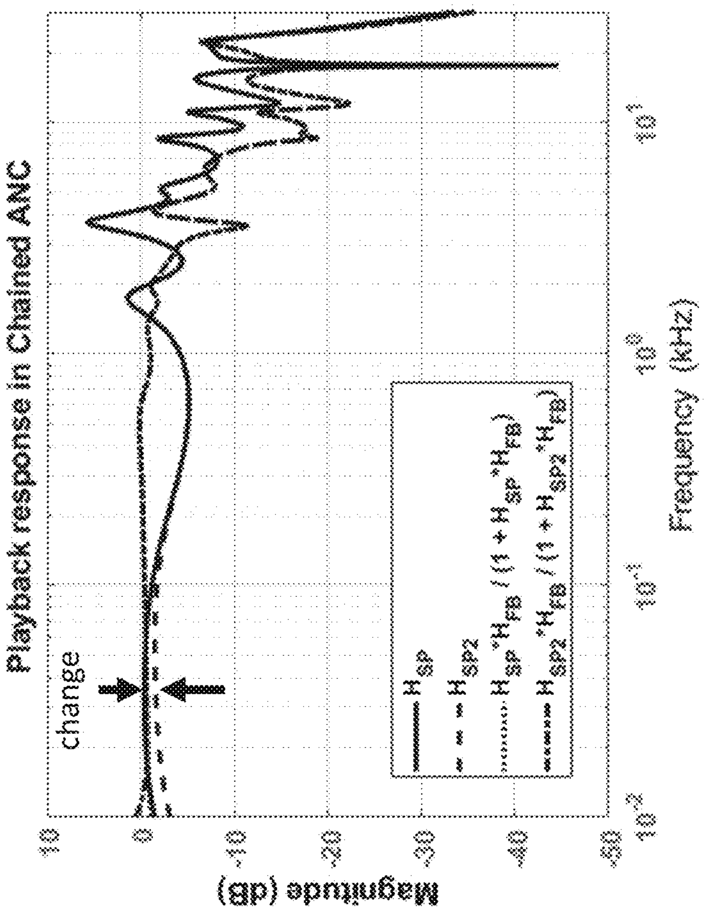
FIG. 23 illustrates aspects of the playback response of an ANC device according to an embodiment with a chained ANC architecture.

From the point of view of the playback signal the transfer path from the digital input to the output (as a sound wave) can be described by the transfer function $H'_{SP}(z)$ for the FF ANC filter 710 defined in Eq. [11] above. In comparison with the previously described playback path issues due to the SP variation of the HYBRID ANC device 500 (as illustrated in FIG. 15), the transfer function $H'_{SP}(z)$ used by the ANC device 700 according to an embodiment is more stable and flat, as can be taken from FIG. 23. As will be appreciated, a minor SP variance may be compensated with no significant $H'_{SP}(z)$ changes, which means a stable playback path in the ANC device 700 according to an embodiment.

However, it will be appreciated that the design described above may act as a low-pass filter, which may be undesirable for playback mode applications of the ANC device 700. Therefore, as already described above, in an embodiment the ANC device 700 further comprises the EQ filter 740 for keeping the overall playback transfer function equal to the initial SP without ANC. In an embodiment, the EQ filter 740 may be implemented by approximating the following ratio [13]:

$$H_{EQ}(z) = \frac{H_{SP}(z)}{H'_{SP}(z)} = \frac{1 + H_{SP}(z) * H_{FB}(z)}{H_{FB}(z)} \quad [14]$$

Figure 24:
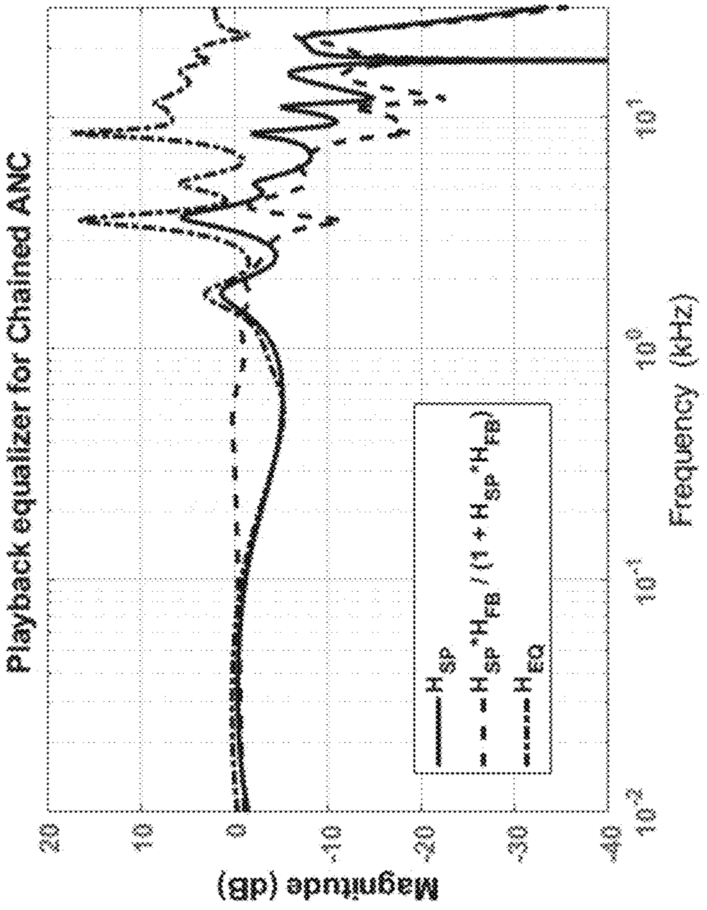
FIG. 24 illustrates aspects of a playback equalizer of an ANC device according to an embodiment with a chained ANC architecture.

For the previously considered example of overhead headphones such a desired equalization curve is shown in FIG. 24. As will be appreciated, instead of fitting the original SP the target playback response for ANC may be set to some psycho-acoustically determined value for a comfortable listening experience. Thus, embodiments of the ANC device 700 allow handling the problem of playback signal distortions due to a SP and SP replica mismatch by exploiting the FB ANC filter 720 as a FCS and introducing equalization provided by the EQ filter 740 to compensate any resulting high-frequency attenuation.

For the HYBRID ANC device 500 described above the main goal for the design of the FB ANC filter 520 is the noise optimization of the sensitivity function defined in Eq. [2]. The adjustment of the filter parameters, i.e. coefficients of the FB ANC filter 520 of the HYBRID ANC device 500 for the sensitivity function in the working frequency range Ω may be based on the following Eq.:

$$H_{FB}(z) \leftarrow \underset{H_{FB}}{\operatorname{argmin}} \int_{\Omega} \left| \frac{1}{1 + H_{SP}(z) * H_{FB}(z)} W_{att}(\omega) \right| \Bigg|_{z=j\omega} d\omega \qquad [15]$$

where the weight $W_{att}(\omega)$ generally corresponds to the inverse of the expected noise spectrum:

$$W_{att}(\omega) = \frac{1}{|S_{noise}(\omega)|} \qquad [16]$$

In contrast thereto, according to an embodiment a primary goal of the adjustment of the filter parameters, i.e. coefficients of the FB ANC filter 720 of the ANC device 700 may be achieving a unity gain ("flat") frequency response over the maximum frequency range Ω, as described by the following Eq.:

$$H_{FB}(z) \leftarrow \underset{\Omega \quad H_{FB}}{\operatorname{maxargmin}} \int_{\Omega} \left| 1 - \frac{H_{SP}(z) * H_{FB}(z)}{1 + H_{SP}(z) * H_{FB}(z)} \right| \Bigg|_{z=j\omega} d\omega \qquad [17]$$

Thus, in an embodiment, the processing circuitry of the ANC device 700 is configured to adjust, in particular optimize the filter parameters, i.e. filter coefficients of the FB ANC filter 720 such that the frequency range of the FB ANC filter 720 is extended.

As will be appreciated, both the HYBRID ANC device 500 as well as embodiments of the ANC device 700 may have the same constraints regarding the filter parameters of the FB ANC filter 720 during optimization, which may be based on the requirement for stability of the following characteristic polynomial:

$$D(j\omega)) = 1 + H_{SP}(j\omega) H_{FB}(j\omega) \qquad [18]$$

According to an embodiment, the ANC device 700 may implement one or more available FCS stability criterions, for instance, the Nyquist stability criterion or the Routh stability criterion. The processing circuitry of the ANC device 700 may be configured to select a specific stability criterion based on the SP model used and the implementation selection for the FB ANC filter 720. Thus, to summarize, according to embodiments the FB ANC filter 720 of the ANC device 700 may be implemented as a digital integrator as well as auxiliary filters to fit optimization goals (as described by Eq. [17] above) and fulfil stability constraints based on Eq. [18] above.

In the HYBRID ANC device 500 described above the FF ANC filter 510 is considered as an independent, i.e. parallel module (i.e. independent from the FB ANC filter 520) with the prediction of the PP as the main optimization goal:

$$H_{FF}(z) \leftarrow \underset{\Omega \quad H_{FF}}{\operatorname{maxargmin}} \int_{\Omega} |H_{PP}(z) + H_{SP}(z) * H_{FF}(z)| \Big|_{z=j\omega} d\omega \qquad [19]$$

In contrast thereto, according to an embodiment of the ANC device 700 for adjusting, i.e. optimizing the filter parameters, i.e. coefficients of the FF ANC filter 710 the FB ANC attenuation and SP changes may be taken into account, which leads to an optimization goal described by the following equation:

$$H_{FF}(z) \leftarrow \underset{\Omega \quad H_{FF}}{\operatorname{maxargmin}} \int_{\Omega} |H'_{PP} + H'_{SP} * H'_{FF}| \Big|_{z=j\omega} d\omega = \underset{\Omega \quad H_{FF}}{\operatorname{maxargmin}} \int_{\Omega} |H_{PP}(z) + H_{FB}(z) * H_{SP}(z) * H_{FF}(z)| \Big|_{z=j\omega} d\omega \qquad [20]$$

Thus, the ANC device 700 according to an embodiment allows for an explicit collaborative optimization of the FB ANC filter 720 and the FF ANC filter 710 based on equations [17] and [20] to achieve the maximum noise attenuation performance. Taking into account that $H'_{SP}(z)$ tends to be 'flat' within the working frequency range of the FB ANC filter 720, equation [20] can be simplified as follows:

$$H_{FF}(z) \leftarrow \underset{H_{FF}}{\operatorname{argmin}} \int_{\Omega_{FB}} |H'_{PP}(z) + H_{FF}(z)| \Big|_{z=j\omega} d\omega \qquad [21]$$

where $\Omega_{FB}$ denotes the stabilized frequency range achieved for the optimized FB ANC filter 720. As can be appreciated from Eq. [21], in embodiments of the ANC device 700 the successful tuning of the FF ANC filter 710 may be simplified to a PP identification after the FB ANC bandwidth maximization, which allows achieving the optimization goals more efficiently than in the case of the HYBRID ANC device 500 with formally independent FF ANC filter 510 and FB ANC filter 520 design. Thus, in an embodiment, the processing circuitry of the ANC device 700 is configured to adjust, i.e. optimize the filter parameters of the FF ANC filter 710 together with the filter parameters of the FB ANC filter 720 such that the frequency range of the FB ANC filter 720 is extended and the noise cancellation performance of the FF ANC filter 710 and the FB ANC filter 720 is improved.

Embodiments of the ANC device 700 allow providing a stable response for the playback signal in the stabilized frequency range $\Omega_{FB}$, which is robust both to external noise (output disturbances) as well as SP self-deviations. Taking into account Eq. [14] in an embodiment the EQ filter 740 with the transfer function $H_{EQ}$ may be adjusted, i.e. optimized on the basis of the following equations:

$$H_{EQ1}(z) \leftarrow \underset{H_{EQ1}}{\operatorname{argmin}} \int_{\Omega_{FB}} |H_{EQ1}(z) - H_{SP}(z)| \Big|_{z=j\omega} d\omega \quad [22]$$

$$H_{EQ2}(z) \leftarrow \underset{H_{EQ2}}{\operatorname{argmin}} \int_{\Omega \neq \Omega_{FB}} |1 + H_{FB}(z) * (H_{SP}(z) - H_{EQ2}(z)| \Big|_{z=j\omega} d\omega \quad [23]$$

$$H_{EQ}(z) = H_{EQ1}(z) + H_{EQ2}(z) \quad [24]$$

The resulting playback transfer function will repeat the original (desired) SP transfer function $H_{SP}(z)$ and will be robust to attenuation by the FB ANC filter 720 due to SP changes. In an embodiment, the processing circuitry of the ANC device 700 may be configured to adjust the transfer function $H_{EQ}(z)$ of the EQ filter 740 taking into account the FB ANC filter 720 by a collaborative optimization based on the equations [17], [22], and [23] above. Moreover, the processing circuitry of the ANC device 700 may be configured to collaborative optimize the FB ANC filter 720, the FF ANC filter 710 and the Playback EQ filter 740 using the set of equations [17], [20], [22], and [23] or [17], [21], [22], and [23] (the later selection may be an even better choice leading to a balanced solution for robust Playback Mode support and noise attenuation). Thus, in an embodiment, the processing circuitry of the ANC device 700 is configured to collaboratively adjust, i.e. optimize the filter parameters of the EQ filter 740 together with the filter parameters of the FF ANC filter 710 and the filter parameters of the FB ANC filter 720 such that the frequency range of the FB ANC filter 720 is extended, the noise cancellation performance of the FF ANC filter 710 and the FB ANC filter 720 is improved and high-frequency attenuation of the FB ANC filter 720 is compensated with the EQ filter 740. The collaborative tuning of the filter parameters for the FB ANC filter 720, the FF ANC filter 710, and the Playback EQ digital filter 740 of the ANC device 700 may lead to a balanced and optimal solution for the ANC device 700.

Figure 25:
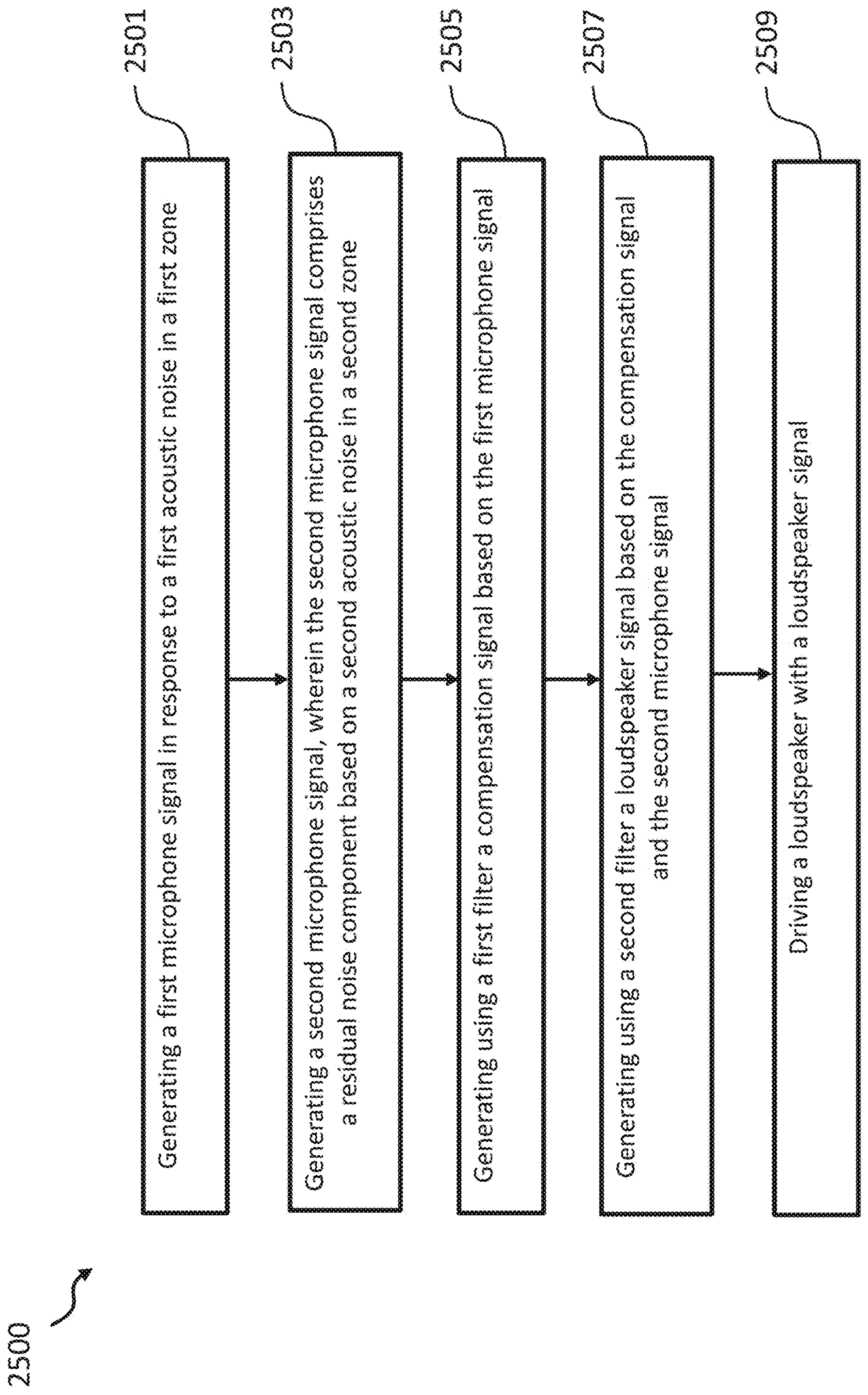
FIG. 25 is a flow diagram illustrating a chained ANC method according to an embodiment.

FIG. 25 is a flow diagram illustrating a chained ANC method 2500 according to an embodiment. In an embodiment, the chained ANC method may be performed by the embodiment of the ANC device 700 of FIGS. 19*a* and 19*b* and/or by the embodiment of the ANC device 700 of FIGS. 20*a* and 20*b*.

The ANC method 2500 comprises a first step 2501 of generating a first microphone signal in response to a first acoustic noise in a first zone 780. The ANC method 2500 comprises a further step 2503 of generating a second microphone signal, wherein the second microphone signal comprises a residual noise component based on a second acoustic noise in a second zone 790. Moreover, the ANC method 2500 comprise a step 2505 of generating using the FF ANC filter 710 a compensation signal based on the first microphone signal. The ANC method 2500 comprises a further step 2507 of generating using the FB ANC filter 720 a loudspeaker signal based on the compensation signal and the second microphone signal. Moreover, the ANC method 2500 comprises a step 2509 of driving the loudspeaker 705 with the loudspeaker signal.

As already mentioned above, the ANC method 2500 may be performed by the ANC device 700 described above in the context of FIGS. 19*a*, 19*b* and/or FIGS. 20*a*, 20*b*. Thus, as will be readily appreciated, further embodiments of the ANC method 2500 result directly from the functionality of the ANC device 700 as well as its different embodiments described above.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely an example. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

What is claimed is:

1. An active noise cancellation (ANC) device, comprising:

a first microphone configured to generate a first microphone signal in response to a first acoustic noise in a first zone of the ANC device;

a second microphone configured to generate a second microphone signal in response to a second acoustic noise in a second zone of the ANC device;

a loudspeaker configured to be driven with a loudspeaker signal; and processing circuitry configured to:

generate a feedforward anti-noise signal using a first filter and based on the first microphone signal being filtered by the first filter, generate an equalized playback signal from a playback signal using an equalization filter, and generate a loudspeaker playback signal using a second filter as a feedback active noise cancellation filter and based on the feedforward anti-noise signal, the equalized playback signal, and the second microphone signal being filtered by the second filter, wherein the equalized playback signal is generated by the equalization filter to be equalized with the feedforward anti-noise signal.

2. The ANC device of claim 1, wherein the processing circuitry is further configured to sum the equalized playback signal and the feedforward anti-noise.

3. The ANC device of claim 1, wherein the processing circuitry is configured to generate, using the second filter, the loudspeaker signal based on a difference between (i) the sum of the equalized playback signal and the feedforward anti-noise and (ii) the second microphone signal.

4. The ANC device of claim 1, wherein the second microphone signal comprises a residual noise component and a playback signal component.

5. The ANC device of claim 1, wherein the equalization filter comprises at least one of an IIR filter, a FIR filter, and a warped FIR filter.

6. The ANC device of claim 1, wherein the second filter comprises a plurality of second filter parameters, and wherein the processing circuitry is configured to adjust the plurality of second filter parameters for extending a frequency range of the second filter.

7. The ANC device of claim 6, wherein the second filter comprises at least one of an infinite impulse response (IIR) filter, a finite impulse response (FIR) filter, and a warped FIR filter.

8. The ANC device of claim 6, wherein the first filter comprises a plurality of first filter parameters, and wherein the processing circuitry is configured to adjust the plurality of first filter parameters together with the plurality of second filter parameters for extending the frequency range of the second filter and improving the noise cancellation performance of the first filter and the second filter.

9. The ANC device of claim 8, wherein the first filter comprises at least one of an infinite impulse response (IIR) filter, a finite impulse response (FIR) filter, and a warped FIR filter.

10. The ANC device of claim 9, wherein the equalization filter comprises a plurality of equalization filter parameters, wherein the processing circuitry is configured to adjust the plurality of equalization filter parameters together with the plurality of first filter parameters and the plurality of second filter parameters in order to extend the frequency range of the second filter, improve the noise cancellation performance of the first filter and the second filter, and compensate high-frequency attenuation of the second filter with the equalization filter.

11. The device of claim 1, wherein the equalization filter is configured to receive the playback signal as input and pre-process the playback signal to pre-shape the playback signal to generate the equalized playback signal.

12. The device of claim 11, wherein the equalization filter is configured to compensate for attenuation at higher frequencies caused by bandwidth limitations of the second filter.

13. An active noise cancellation (ANC) method, comprising:

generating a first microphone signal in response to a first acoustic noise in a first zone of an ANC device;

generating a second microphone signal in response to a second acoustic noise in a second zone of the ANC device;

generating a feedforward anti-noise signal using a first filter and based on the first microphone signal being filtered by the first filter;

generating an equalized playback signal from a playback signal using an equalization filter;

generating a loudspeaker signal using a second filter as a feedback active noise cancellation filter and based on the feedforward anti-noise signal, the equalized playback signal, and the second microphone signal being filtered by the second filter; and driving a loudspeaker with the loudspeaker signal;

wherein the equalized playback signal is generated by the equalization filter to be equalized with the feedforward anti-noise signal.

14. The ANC method of claim 13, wherein the second microphone signal comprises a residual noise component and a playback signal component.

15. The ANC method of claim 13, wherein the generating the loudspeaker signal comprises generating, using the second filter, the loudspeaker signal based on a difference between (i) a sum of the equalized play back signal and the feedforward anti-noise and (ii) the second microphone signal.

16. A computer program product comprising a non-transitory computer-readable storage medium having stored thereon processor executable program code configured to cause a computer or a processor to perform the method of claim 13.

* * * * *